US010489723B2

(12) United States Patent
Dearman et al.

(10) Patent No.: US 10,489,723 B2
(45) Date of Patent: Nov. 26, 2019

(54) APPARATUS AND METHOD FOR PROVIDING FOR COMMUNICATIONS USING DISTRIBUTION LISTS

(75) Inventors: David Alexander Dearman, San Bruno, CA (US); Vidya Raghavan Setlur, Portola Valley, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/476,644

(22) Filed: May 21, 2012

(65) Prior Publication Data

US 2013/0311893 A1 Nov. 21, 2013

(51) Int. Cl.
*G06F 3/00* (2006.01)
*G06Q 10/00* (2012.01)
*G06F 3/048* (2013.01)
*G06F 3/0482* (2013.01)

(52) U.S. Cl.
CPC ............ *G06Q 10/00* (2013.01); *G06F 3/048* (2013.01); *G06F 3/0482* (2013.01)

(58) Field of Classification Search
CPC ............................... G06F 3/0482; G06F 3/048
USPC .......................................................... 715/738
See application file for complete search history.

(56) References Cited

U.S. PATENT DOCUMENTS

| 5,701,583 | A | 12/1997 | Harbin et al. |
| 6,480,885 | B1 | 11/2002 | Olivier |
| 7,849,135 | B2 | 12/2010 | Agrawal et al. |
| 8,312,392 | B2 | 11/2012 | Forutanpour et al. |
| 8,391,786 | B2 | 3/2013 | Hodges et al. |
| 8,413,059 | B2* | 4/2013 | Lee ............. G06Q 10/107 709/206 |
| 8,417,779 | B2* | 4/2013 | Weber ................. 709/204 |
| 8,423,076 | B2* | 4/2013 | Kim ................ G06F 3/0346 345/156 |
| 8,457,651 | B2 | 6/2013 | Forutanpour et al. |
| 8,458,363 | B2* | 6/2013 | Rosenblatt et al. ........ 709/248 |
| 8,542,186 | B2 | 9/2013 | Alameh et al. |
| 8,615,797 | B2 | 12/2013 | Levien et al. |
| 8,689,132 | B2* | 4/2014 | Lamiraux et al. ........... 715/784 |

(Continued)

FOREIGN PATENT DOCUMENTS

TW 2008-44824 A 11/2008
WO WO 2004/075169 A2 9/2004

(Continued)

OTHER PUBLICATIONS

International Search Report and Written Opinion for Application No. PCT/FI2013/050504; dated Sep. 10, 2013.

(Continued)

*Primary Examiner* — Kieu D Vu
*Assistant Examiner* — Andrew Chung
(74) *Attorney, Agent, or Firm* — Alston & Bird LLP

(57) ABSTRACT

An apparatus, method, and computer program product are described that determine a subset of users from a predefined distribution list based on a common characteristic of members of the subset. A common characteristic may be the fact that members of the subset have been determined to be proximate the source user's device. The source user may communicate (e.g., share content) with members of the identified subset through selection of the distribution list, while non-members of the subset would be excluded from the communication.

12 Claims, 22 Drawing Sheets

(56) References Cited

U.S. PATENT DOCUMENTS

| | | | |
|---|---|---|---|
| 8,918,463 B2* | 12/2014 | Garcia | G06Q 50/01 370/260 |
| 8,977,987 B1* | 3/2015 | Korn | G06F 3/016 715/702 |
| 2004/0266348 A1 | 12/2004 | Deshpande et al. | |
| 2006/0087564 A1 | 4/2006 | Kawamura | |
| 2006/0132675 A1* | 6/2006 | Choi | G06F 1/1626 349/76 |
| 2007/0006094 A1 | 1/2007 | Canfield et al. | |
| 2007/0255807 A1 | 11/2007 | Hayashi et al. | |
| 2007/0276864 A1 | 11/2007 | Espelien | |
| 2007/0286111 A1 | 12/2007 | Corson et al. | |
| 2008/0201376 A1* | 8/2008 | Khedouri et al. | 707/104.1 |
| 2008/0222127 A1* | 9/2008 | Bergin | 707/5 |
| 2008/0229211 A1* | 9/2008 | Herberger et al. | 715/744 |
| 2008/0235324 A1* | 9/2008 | Abernethy et al. | 709/201 |
| 2009/0017799 A1 | 1/2009 | Thorn | |
| 2009/0028179 A1 | 1/2009 | Albal | |
| 2009/0031258 A1 | 1/2009 | Arrasvuori et al. | |
| 2009/0186605 A1 | 7/2009 | Apfel et al. | |
| 2009/0265470 A1 | 10/2009 | Shen et al. | |
| 2009/0307325 A1 | 12/2009 | Szeto | |
| 2009/0307598 A1* | 12/2009 | Giles | 715/738 |
| 2009/0313555 A1* | 12/2009 | Stovicek | G06Q 10/10 715/753 |
| 2009/0319181 A1 | 12/2009 | Khosravy et al. | |
| 2010/0042941 A1* | 2/2010 | Vance | G06F 3/04817 715/764 |
| 2010/0058182 A1 | 3/2010 | Jung | |
| 2010/0186034 A1 | 7/2010 | Walker | |
| 2010/0241711 A1* | 9/2010 | Ansari et al. | 709/205 |
| 2010/0245262 A1* | 9/2010 | Vance | G06Q 10/107 345/173 |
| 2010/0287504 A1* | 11/2010 | Vance | G06Q 10/107 715/811 |
| 2011/0081923 A1 | 4/2011 | Forutanpour et al. | |
| 2011/0083111 A1* | 4/2011 | Forutanpour | H04W 4/21 715/863 |
| 2011/0088002 A1 | 4/2011 | Freer | |
| 2011/0106889 A1* | 5/2011 | Scott | G06Q 10/107 709/206 |
| 2011/0191823 A1 | 8/2011 | Huibers | |
| 2011/0237193 A1 | 9/2011 | Shen et al. | |
| 2012/0046864 A1* | 2/2012 | Zilka | G01C 21/362 701/533 |
| 2012/0046906 A1 | 2/2012 | Alameh et al. | |
| 2012/0054631 A1* | 3/2012 | Nurmi | G06F 3/0481 715/744 |
| 2012/0066628 A1 | 3/2012 | Ens et al. | |
| 2012/0110096 A1 | 5/2012 | Smarr et al. | |
| 2012/0110474 A1* | 5/2012 | Chen et al. | 715/753 |
| 2012/0226757 A1* | 9/2012 | McFarland et al. | 709/206 |
| 2012/0299772 A1 | 11/2012 | Shtrom et al. | |
| 2012/0331418 A1* | 12/2012 | Bonforte | G06Q 10/107 715/784 |
| 2013/0014040 A1* | 1/2013 | Jagannathan | G06Q 50/01 715/765 |
| 2013/0067404 A1* | 3/2013 | Morrow | G06F 3/0482 715/810 |
| 2013/0073400 A1* | 3/2013 | Heath | G06Q 30/02 705/14.73 |
| 2013/0225077 A1* | 8/2013 | Schultz et al. | 455/41.1 |
| 2013/0246418 A1* | 9/2013 | Bergin | 707/736 |
| 2014/0123025 A1* | 5/2014 | Bau | H04L 51/04 715/752 |
| 2015/0332416 A1* | 11/2015 | Ben-Yair | G06Q 10/00 705/319 |

FOREIGN PATENT DOCUMENTS

| | | |
|---|---|---|
| WO | WO 2009/010312 A1 | 1/2009 |
| WO | WO 2011/041427 A2 | 4/2011 |
| WO | WO 2011/062952 A2 | 5/2011 |
| WO | WO 2011/073821 A1 | 6/2011 |
| WO | WO 2011/153623 A2 | 12/2011 |

OTHER PUBLICATIONS

De Lucia, Andrea, et al.; SmartBuilding: a People-to-People-to-Geographical-Places Mobile System Based on Augmented Reality; UBICOMM 2010: The Fourth International Conference on Mobile Ubiquitous Computing, Systems, Services and Technologies; pp. 263-268.

Tehrani, Rich; Gogobeans Enables Mobile Cloud Sharing; dated Mar. 21, 2011; pp. 1-6.

Class Message Multicaster; Downloaded on Feb. 27, 2012; pp. 1-4.

Peng, Chunyi, et al.; Point&Connect: Intention-based Device Pairing for Mobile Phone Users; Mobile Systems 2009; Jun. 22-25, 2009; pp. 137-149.

Xing, Bo; Proximiter: Enabling mobile proximity-based content sharing on portable devices; Pervasive Computing and Communications, IEEE International Conference; Mar. 9-13, 2009; pp. 1-3.

U.S. Appl. No. 13/356,671, filed Jan. 24, 2012 entitled *Directional Peer-to-Peer Networking*.

PCT Application No. PCT/US2012/026877, filed Feb. 28, 2012, entitled *Determining a Direction of a Wireless Transmitter*.

Office Action for U.S. Appl. No. 13/476,615 dated Oct. 31, 2013.
Office Action for U.S. Appl. No. 13/476,615 dated Feb. 14, 2014.
Office Action for U.S. Appl. No. 13/476,693 dated Apr. 10, 2014.
Office Action for U.S. Appl. No. 13/476,615 dated Oct. 1, 2014.
Office Action for U.S. Appl. No. 13/476,693 dated Sep. 10, 2014.
Office Action for U.S. Appl. No. 13/476,615 dated Jun. 5, 2014.
Office Action for U.S. Appl. No. 13/476,615 dated Mar. 12, 2015.
Notice of Allowance for U.S. Appl. No. 13/476,693 dated Feb. 6, 2015.
Examiner's Answer for U.S. Appl. No. 13/476,615 dated Jan. 21, 2016.
Office Action for U.S. Appl. No. 13/476,615 dated Aug. 21, 2017.

\* cited by examiner

APPARATUS AND METHOD FOR PROVIDING FOR COMMUNICATIONS USING DISTRIBUTION LISTS

TECHNOLOGICAL FIELD

Embodiments of the present invention relate generally to providing for communication with users through the use of pre-defined user distribution lists.

BACKGROUND

The information age has made information available to users through various wired and wireless networks on many different types of devices, from laptop computers to cellular telephones. Along with the increased access to information, however, has come increased user demand for sharing content with other users through their user devices, e.g., without necessarily logging on to a computer to manually copy and transfer files.

The prevalence of mobile devices is such that a large portion of the population carries mobile devices (such as cellular phones, tablets, and laptops). Often, users in the same location have a need or desire to share content with each other.

Accordingly, it may be desirable to provide improved mechanisms by which content can be shared among users.

BRIEF SUMMARY OF EXAMPLE EMBODIMENTS

Accordingly, embodiments of an apparatus, method, and computer program product are described that provide for communication with users through the use of pre-defined user distribution lists, such as by identifying a subset of an established user distribution list including members that are proximate the user's apparatus via a "wave" gesture. In particular, embodiments of an apparatus for facilitating communication with users may include at least one processor and at least one memory including computer program code. The at least one memory and the computer program code may be configured to, with the processor, cause the apparatus to at least access a predefined distribution list, determine a subset of the distribution list based on a common characteristic of members of the subset, receive selection of the distribution list, and provide for communication with members of the subset based on receipt of the selection, where non-members of the subset are excluded from the communication.

In some cases, the common characteristic may comprise proximity between a device associated with the member of the subset and the apparatus, inclusion of the member of the subset in a predefined group of contacts, and/or inclusion of the member of the subset in an established communication session. The at least one memory and the computer program code may be further configured to, with the processor, cause the apparatus to provide for communication with members of the subset by sharing content with members of the subset. Additionally or alternatively, the at least one memory and the computer program code may be further configured to, with the processor, cause the apparatus to provide for a visual indication of the subset determined. Furthermore, the at least one memory and the computer program code may be further configured to, with the processor, cause the apparatus to access the predefined distribution list based on a context of use of the apparatus.

In other embodiments, a method and a computer program product are described for facilitating communication with users by accessing a predefined distribution list; determining a subset of the distribution list based on a common characteristic of members of the subset; receiving selection of the distribution list; and providing for communication with members of the subset based on receipt of the selection, where non-members of the subset are excluded from the communication. The common characteristic may comprise, for example, proximity between a device associated with the member of the subset and the apparatus, inclusion of the member of the subset in a predefined group of contacts, and/or inclusion of the member of the subset in an established communication session.

In some cases, communication with members of the subset may be provided for by sharing content with members of the subset. The method may further provide for a visual indication of the subset determined. In addition or alternatively, the predefined distribution list may be based on a context of use of the apparatus.

In still other embodiments, an apparatus is described for facilitating communication with users. The apparatus may include means for accessing a predefined distribution list; means for determining a subset of the distribution list based on a common characteristic of members of the subset; means for receiving selection of the distribution list; and means for providing for communication with members of the subset based on receipt of the selection, where non-members of the subset are excluded from the communication.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
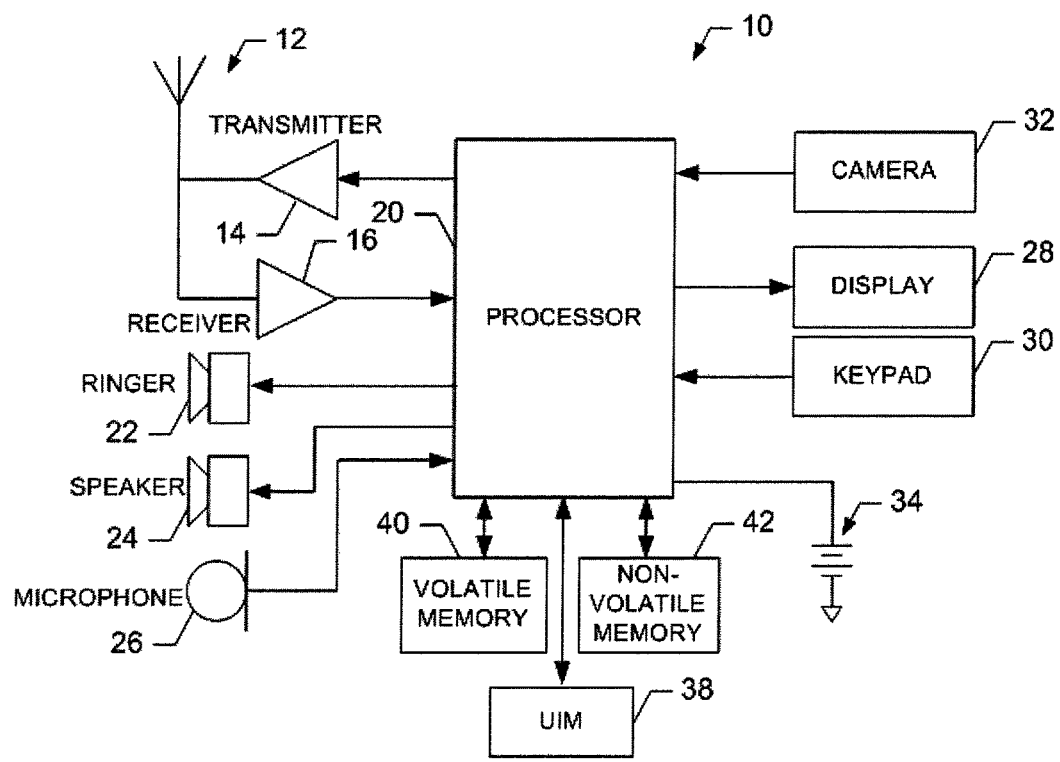
FIG. 1 illustrates one example of a communication system according to an example embodiment of the present invention.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, users of mobile devices who are co-located (e.g., in the same room or in close proximity to each other) often have a need or desire to share content with each other. The users may be friends sitting in a coffee shop exchanging stories who may want to share content with each other, such as photographs of a recent vacation. Or, the users may be co-workers at a meeting who need to distribute files to others in the meeting to facilitate the work discussion.

Different technologies have emerged to facilitate the sharing of content among users. Cloud services, such as Sketchpad, Kaltura, Spotify, Netflix, MobileMe, Sharepoint, etc., typically use a network of remote servers hosted on the Internet to store, manage, and process data, rather than a local server or a personal computer. Such services may work well for remote content sharing, but are often not optimal for content sharing between and among co-located users due to the up-front configuration and set-up efforts that are required.

Bluetooth and Wireless LAN (WLAN) are commonly-used conventional methods of short range ad-hoc communication. Bluetooth, for example, is a low power short-range radio technology that requires communicating devices to be within 10 m from each other. Bluetooth, however, can be difficult to configure, unreliable, and slow when relatively large files (such as media files) are involved. WLAN has an infrastructure mode and an ad-hoc mode, depending on whether the content is routed via an access point or directly point-to-point. The typical indoor range for WLAN is 50 m. WLAN provides physical and data link layers without any specification for higher protocols. As a result, content sharing is less "user-centric" in nature and requires the user to depend on services that are built on the WLAN technology.

Other conventional methods of content sharing may include e-mailing content between users; however, multiple inputs may be required to select recipients of the e-mail, create the e-mail, and send the e-mail, and in some cases the e-mail itself may not be efficiently transferred between the sender and the recipient as a result of firewalls, low bandwidth, server traffic, incomplete or inaccurate recipient addresses, spam filters, etc.

Accordingly, embodiments of the present invention provide for devices, systems, and methods for a user to share content with other users who are proximate to his or her device in a simple and intuitive manner. In some embodiments, a "wave" gesture is used to identify users of devices that are nearby to the source user's device with whom the source user may communicate, such as to share content.

In other embodiments, a subset of users on a predefined distribution list may be identified based on a common characteristic of members of the subset, such as the fact that members of the subset have been determined to be proximate the source user's device (e.g., via the wave gesture). The source user may communicate (e.g., share content) with the identified subset through selection of the distribution list, while non-members of the subset would be excluded from the communication.

In still other embodiments, the source user may be able to create user groups by selecting visual representations of users (e.g., predefined contacts of the source user) and moving the selected visual representations from a first region (e.g., an area of the display in which the visual representations are displayed) to a location outside the first region. Movement of the visual representations in such a manner may serve to designate the location to which the visual representations are moved as an area of the display that can accumulate multiple visual representations and create a group of users including those selected visual representations received in the designated area. The group of users may then be moved or otherwise manipulated as a unit, and content may, for example, be shared with those users. In this way, the source user can easily select those users with whom he or she wishes to communicate without the need to open a dedicated application or access a particular program configured to create user groups. Moreover, the source user may be able to visually identify which of the users available for selection are co-located with him or her or share other common characteristics, such that the source user's selection of those users may be at least partially informed by such factors.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas, such as an array of patch antennas) in operable communication with a transmitter 14 and a receiver 16. In some embodiments, the antenna 12 or antennas may define a pattern of coverage in a direction of interest, for example, providing a particular "angle of view." The antenna 12 or antennas may, for example, be configured to detect Wi-Fi enabled devices within a predefined distance of the antenna within the angle of view, as described in greater detail in U.S. application Ser. No. 13/356,671 entitled "Directional Peer-to-Peer Networking," filed on Jan. 24, 2012, and in PCT Application No. PCT/US2012/026877 entitled "Determining a Direction of a Wireless Transmitter," filed on Feb. 28, 2012, the contents of both of which are incorporated by reference herein in their entirety.

The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may further include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to encode message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. The mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, which depicts certain elements of an apparatus 50 for providing for communication among users. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a tablet, a mobile telephone, a laptop computer, or other user terminal. Moreover, in some cases, the apparatus 50 may be on a fixed device such as a server or other service platform, and the content may be presented (e.g., via a server/client relationship) on a remote device such as a user terminal (e.g., the mobile terminal 10) based on processing that occurs at the fixed device.

Figure 2:
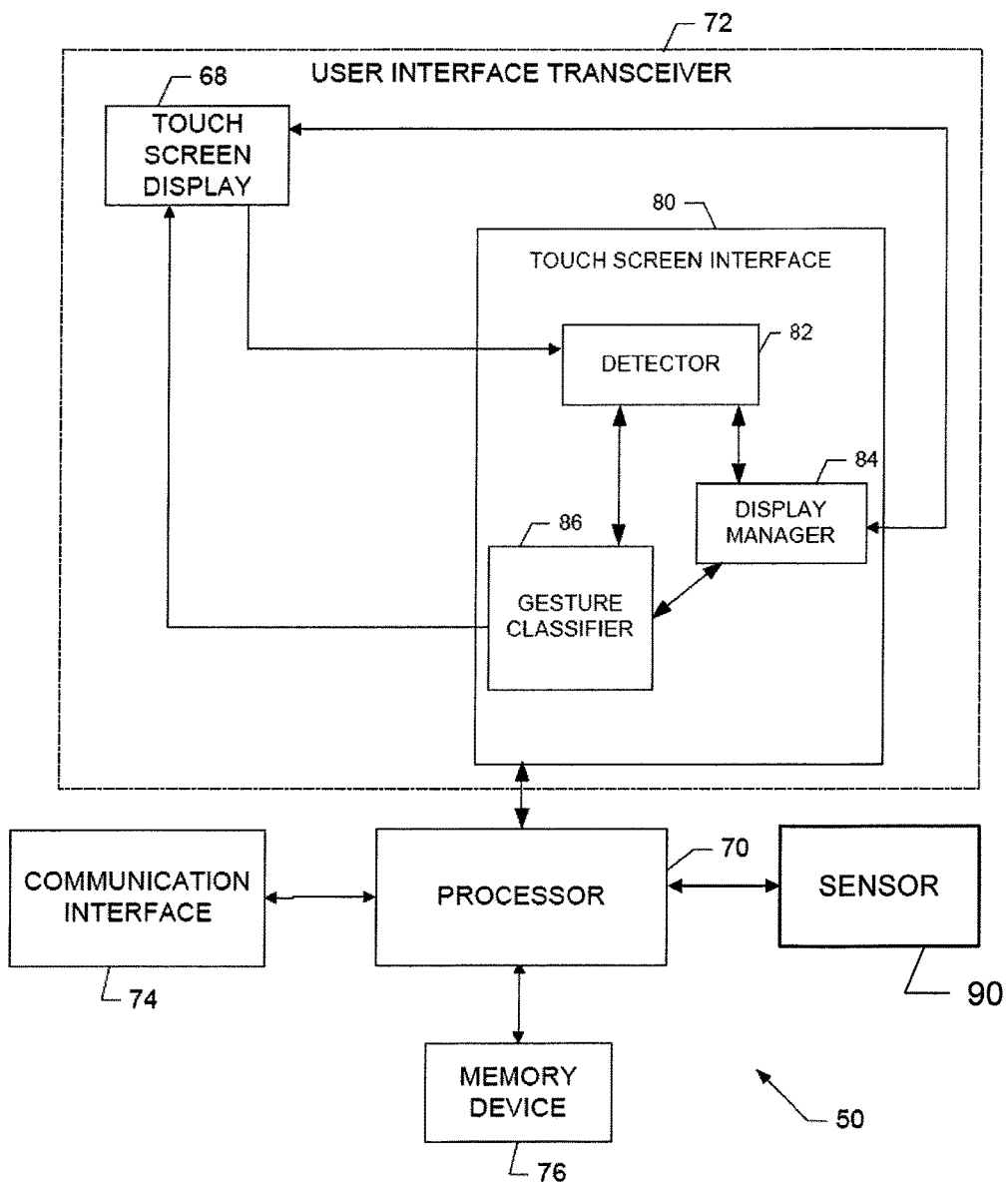
FIG. 2 illustrates a schematic block diagram of an apparatus for providing for communication among users according to an example embodiment of the present invention.
Figure 3:
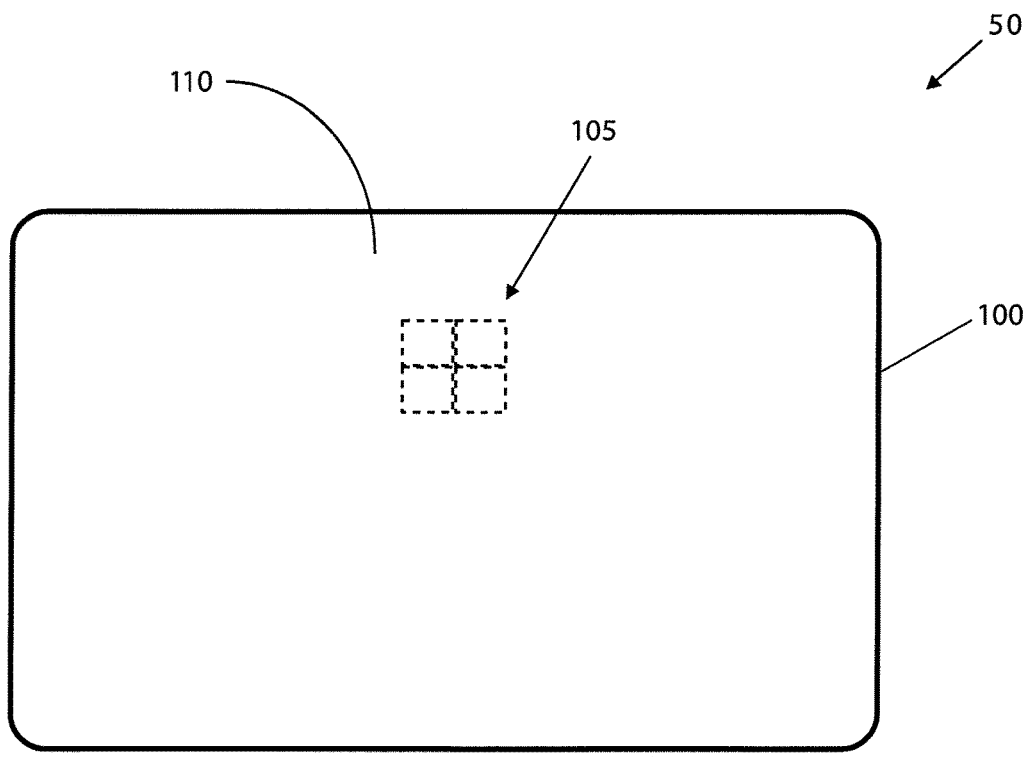
FIG. 3 illustrates a back side of an apparatus including an array of antennas according to an example embodiment of the present invention.

It should also be noted that while FIG. 2 illustrates one example of a configuration of an apparatus for providing for communication among users, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 providing for communication among users may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

In some embodiments, the touch screen interface 80 may include a detector 82, a display manager 84, and a gesture classifier 86. Each of the detector 82, the display manager 84, and the gesture classifier 86 may be any device or means embodied in either hardware or a combination of hardware and software configured to perform the corresponding functions associated with the detector 82, the display manager 84, and the gesture classifier 86, respectively, as described herein. In an exemplary embodiment, each of the detector 82, the display manager 84, and the gesture classifier 86 may be controlled by or otherwise embodied as the processor 70.

The detector 82 may be in communication with the touch screen display 68 to receive user inputs in order to recognize and/or determine a touch event based on each input received at the detector 82. A touch event may be defined as a detection of an object, such as a stylus, finger, pen, pencil, cellular telephone, digital camera, or any other mobile device (including the mobile terminal 10 shown in FIG. 1) or object, coming into contact with a portion of the touch screen display in a manner sufficient to register as a touch. In this regard, for example, a touch event could be a detection of pressure on the screen of the touch screen display 68 above a particular pressure threshold over a given area. Subsequent to each touch event, the detector 82 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 86 for gesture classification. As such, the detector 82 may include or be in communication with one or more force sensors configured to measure the amount of touch pressure (e.g., force over a given area) applied as a result of a touch event, as an example.

The gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, pinch event (e.g., a pinch in or pinch out), and/or the like.

A touch may be defined as a touch event that impacts a single area (without or with minimal movement on the surface of the touch screen display 68) and then is removed. A multi-touch may be defined as multiple touch events sensed concurrently (or nearly concurrently). A stroke may be defined as a touch event followed immediately by motion of the object initiating the touch event while the object remains in contact with the touch screen display 68. In other words, the stroke may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character or symbol.

A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

The gesture classifier 86 may also be configured to communicate detection information regarding the recognition, detection, and/or classification of a touch event to the display manager 84. The display manager 84 may be configured to provide control over modifications made to that which is displayed on the touch screen display 68 based on the detection information received from the detector 82 and gesture classifications provided by the gesture classifier 86 in accordance with the responses prescribed for each respective gesture classification and implementation characteristic determined by the gesture classifier 86. In other words, the display manager 84 may configure the display (e.g., with respect to the content displayed and/or the user interface effects presented relative to the content displayed) according to the gesture classification and implementation characteristic classification determined for a given touch event that may be detected at the display.

According to some embodiments, the apparatus 50 may also include one or more sensors 90 that are configured to detect movement of the apparatus. In this regard, the sensor 90 may include an accelerometer that can detect an acceleration of the apparatus 50, such as a movement of the device embodying the apparatus in a certain direction, a gyrometer that can detect a rotation of the apparatus, and/or other sensors. The sensor 90 may thus be configured to detect and relay (for example, to the processor 70) orientation inputs indicative of the orientation of the apparatus 50 with respect to a reference orientation.

Figure 4A:
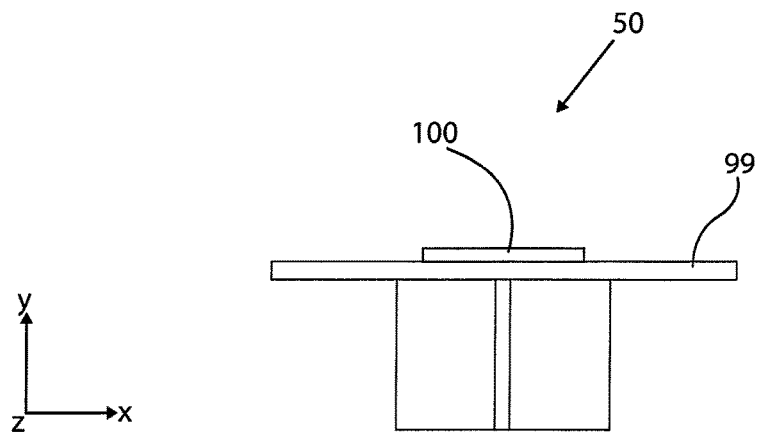
FIGS. 4A and 4B illustrate an apparatus in a first position according to an example embodiment of the present invention.
Figure 4B:
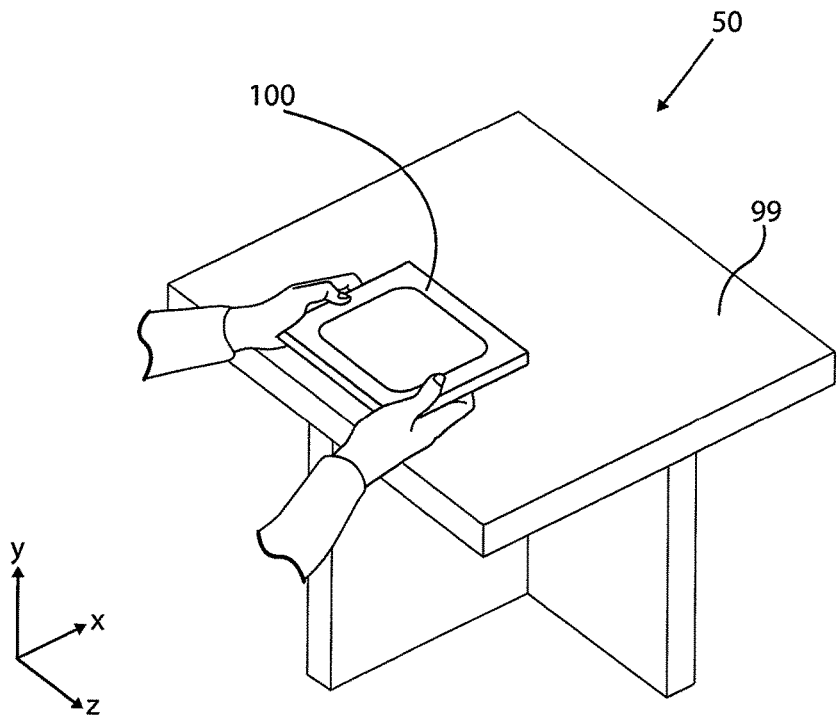
Figure 5A:
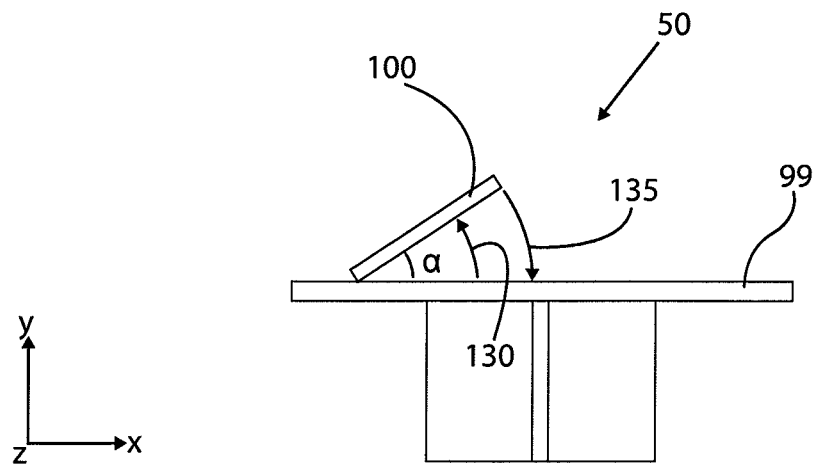
FIGS. 5A and 5B illustrate an apparatus in a second position according to an example embodiment of the present invention.
Figure 5B:
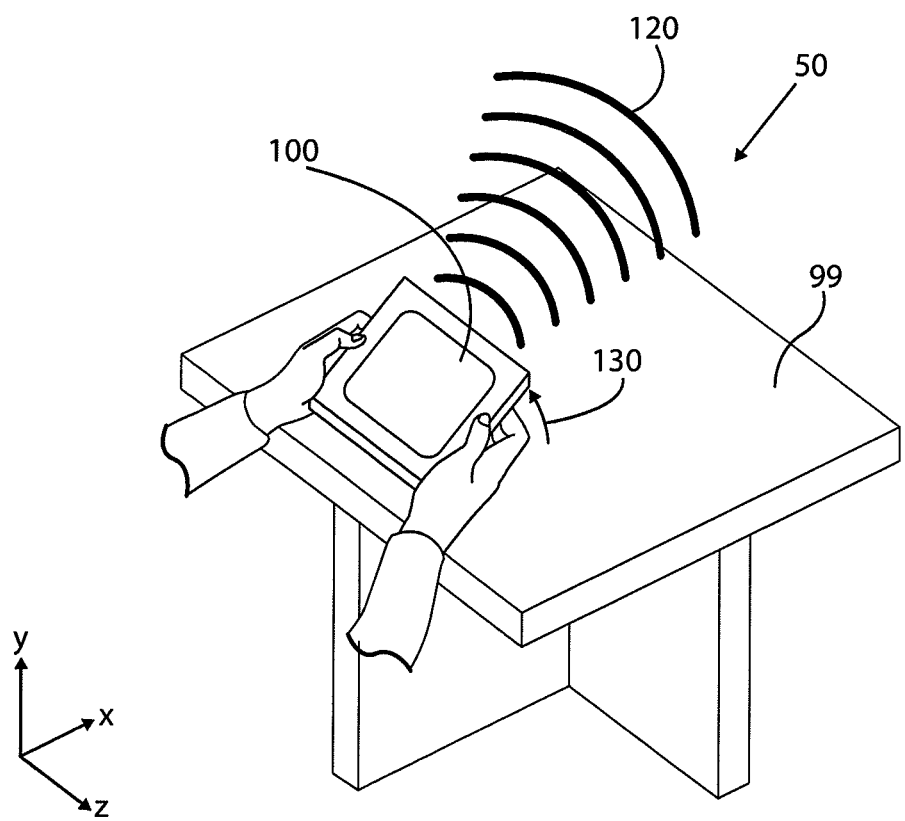

Turning to FIGS. 3-5B, for example, the apparatus 50 in the depicted embodiment may be embodied in a device 100, such as a tablet computer. The apparatus 50 may be configured to include an array of antennas 105 (such as the antennas 12 shown in FIG. 1) that is attached to or otherwise included in the device. The antennas 105 may incorporate or have access to directional radio frequency- (RF-) based hardware and software configured to detect devices that are present in the direction in which the RF signals are emanating. In the depicted embodiment of FIG. 3, for example, the array of antennas 105 is integrated into a back side 110 of the device 100. As such, signals (e.g., a pattern of radiation at a particular frequency) transmitted from the array of antennas 105 may be obscured or blocked when the device 100 is positioned with the back side 110 resting on or adjacent to a surface, such as the table 99 shown in FIGS. 4A and 4B or a user's lap. When the device 100 is moved to a different orientation in which the array of antennas 105 is no longer on any surface, as shown in FIGS. 5A and 5B, for example, the array of antennas may be exposed such that the signals emanate in a particular direction from the device and can detect devices in a particular coverage area 120 with respect to the device 100.

As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to receive a first orientation input, for example, via the sensor 90 (shown in FIG. 2). The apparatus 50 may be caused to initiate a scanning mode in response to receipt of the first orientation input, during which one or more devices proximate the apparatus are determined as noted above and described in greater detail in U.S. application Ser. No. 13/356,671 and in PCT Application No. PCT/US2012/026877, listed above. The apparatus 50 may be further caused to receive a second orientation input that is different from the first orientation input, and the scanning mode may be terminated in response to the receipt of the second orientation input. The at least one memory and the computer program code may be configured to, with the processor, cause the apparatus 50 to provide for communication with at least one selected device of the one or more devices determined to be proximate the apparatus, as described below.

In this regard, the first orientation input may comprise information from the sensor 90, for example, that indicates relative movement of the apparatus from a first position (such as an initial "at rest" position shown in FIGS. 4A and 4B) to a second position (such as the position shown in FIGS. 5A and 5B). Similarly, the second orientation input may comprise information from the sensor 90, for example, that indicates relative movement of the apparatus from the second position (FIGS. 5A and 5B) back to the first position (FIGS. 4A and 4B). This movement between the first and second positions may simulate a "wave" of the device 100 and may thus be considered a wave gesture for purposes of explanation. In some cases, the second orientation input may indicate a movement of the apparatus from the second position (FIGS. 5A and 5B) to a third position (not shown), which may be close to the first position, for example, or may be in the direction of the first position.

In some embodiments, the first orientation input and/or the second orientation input may include a motion component and/or a duration component. The motion component may include information from the sensor 90 indicating movement of the apparatus, such as indicating that the apparatus (or the device 100 embodying the apparatus) has been moved in a particular direction, at a particular speed, and/or to a particular angle $\alpha$ (shown in FIGS. 5A and 5B). The duration component may include information from the sensor 90 or other components indicating how long the apparatus 50 is maintained in the second position. For example, if the apparatus 50 is moved by the user from the first position (FIGS. 4A and 4B) to the second position (FIGS. 5A and 5B), held in the second position for 5 seconds, then returned to the first position (FIGS. 4A and 4B), the movement from the first position to the second position may be considered the first orientation input, and the movement from the second position back to the first position may be considered the second orientation input.

If, however, the apparatus 50 is maintained in the second position for a period of time longer than a predetermined duration (such as longer than a minute), the movement to the second position may be considered a permanent movement of the device and may not register as a first orientation input, for example. In other words, the user in this case may be considered to be shifting the position of the device without intending to initiate a scanning mode, such as by moving the device from a flat surface (such as the floor) to a relatively inclined surface (such as the user's lap) for the purpose of continuing to interact with the device as before (e.g., not intending to scan for proximate users, but possibly adjusting the position of the device for the user's comfort or ease of use). In this case, the scanning mode that may have been initiated upon receipt of the first orientation input (e.g., the change from the first to the second position) may be terminated once the predetermined duration is exceeded, and any devices determined to be proximate the apparatus may be disregarded.

In some embodiments, rather than being indicative of a change with respect to an initial position (such as the "at rest" first position of FIG. 4A and FIG. 4B), the first orientation input may be indicative of a particular orientation of the device 100, regardless of the previous "status quo" orientation of the device. For example, the first orientation input may correspond to a tilting of the device about a particular axis (such as the z-axis shown) to a particular angle (such as an angle of 30° or more) with respect to a fixed reference position. In this regard, the first orientation input may take into account an acceleration of the device 100 caused by movement from the first position to the second position, e.g., via information from the sensor 90.

Regardless of how the first and second orientation inputs are determined, as noted above, in some embodiments the first orientation input may be indicative of a tilting of the device 100 associated with the apparatus 50 in a first direction (arrow 130 in FIG. 5A) along a tilt plane XY. The second orientation input may be indicative of a tilting of the device 100 associated with the apparatus 50 in a second direction (arrow 135 in FIG. 5A) along the tilt plane XY. Moreover, in some cases, the first orientation input may be indicative of a movement of the device 100 associated with the apparatus 50 that serves to expose the antenna (e.g., the array of antennas 105) of the device for enabling the scanning mode, as described above with reference to FIGS. 3-5B. In other words, prior to receipt of the first orientation input, the array of antennas 105 may be covered or hidden (such as by the surface of a table 99 on which the device is placed, as illustrated in FIGS. 4A and 4B), whereas after receipt of the first orientation input, the array of antennas 105 may be uncovered such that signals may be transmitted for detecting proximate user devices. Accordingly the directional RF sensing of the antennas 105 may be enabled by the alignment of the inherent radiation beam pattern of the antennas 105 in the correct orientation and direction with respect to the proximate users.

Figure 6:
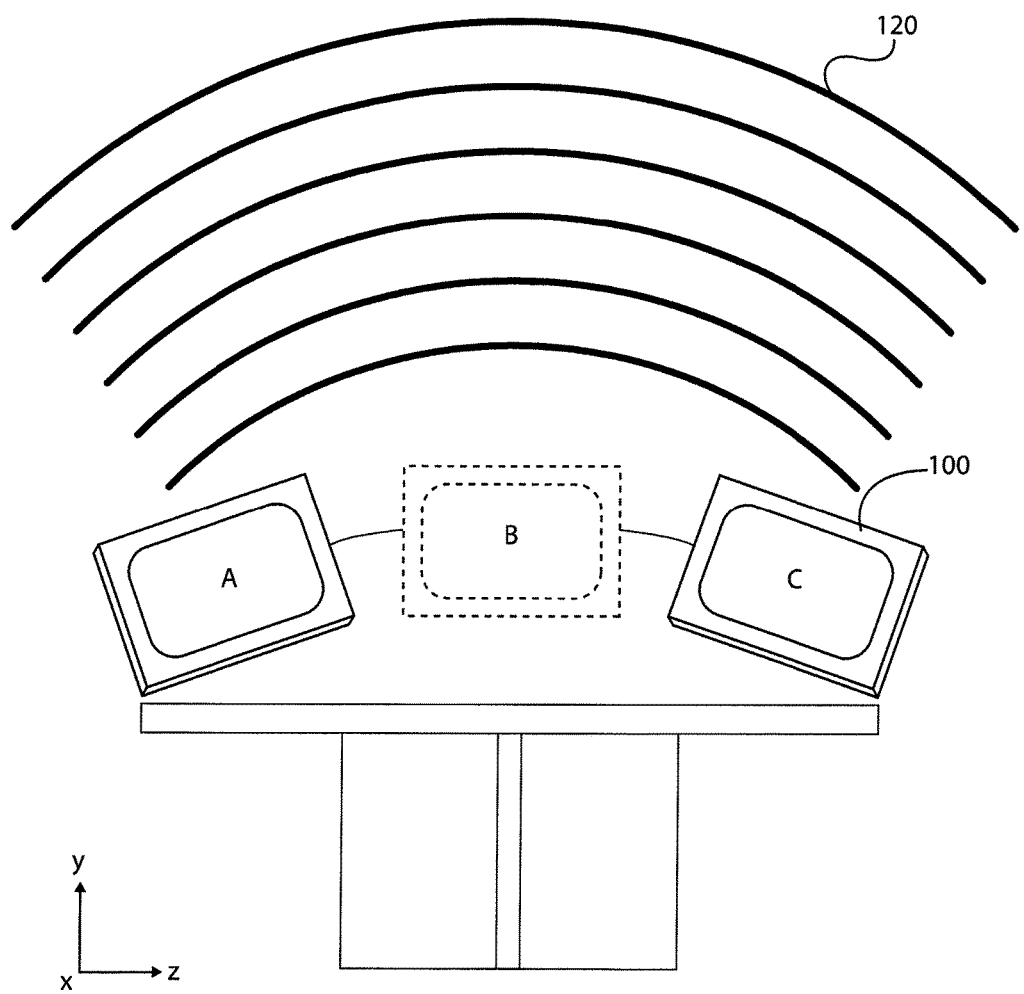
FIG. 6 illustrates a sweep input according to an example embodiment of the present invention.

In some cases, the at least one memory and the computer program code may be configured to, with the processor, cause the apparatus 50 to receive a sweep input and to maintain the scanning mode through a duration of the sweep input. A sweep input is illustrated in FIG. 6 and may be indicative of a rotating of the device associated with the apparatus along a sweep plane XZ that is perpendicular to the tilt plane XY described above. As illustrated, the user may initially move the device 100 from a first position (such as the "at rest" position shown in FIGS. 4A and 4B) to the second position (such as the position shown in FIGS. 5A and 5B). Once in the second position (point A in FIG. 6), the user may rotate the device 100 along the XZ plane (e.g., rotating the device about an axis defined by the user's body) from point A, through point B, to point C at the other end of the sweep gesture. As a result, a larger coverage area 120 may be achieved, and a greater number of devices in the vicinity of the apparatus 50 may be detected.

Figure 17A:
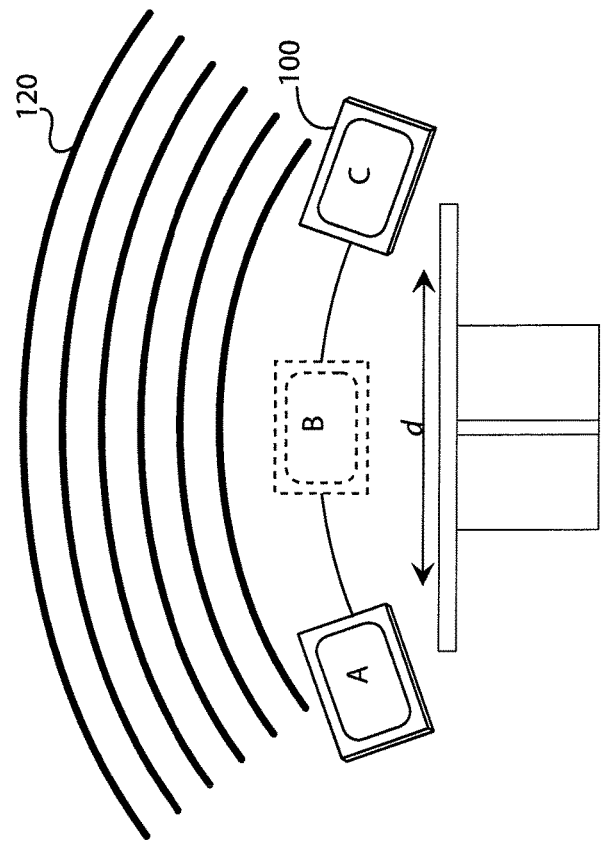
FIGS. 17A-17C illustrate implementations of a wave gesture incorporating different sweep gestures according to an example embodiment of the present invention.
Figure 17B:
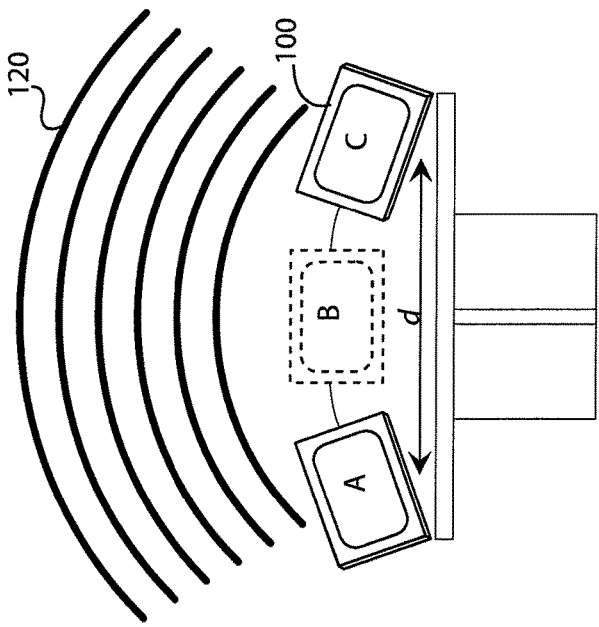
Figure 17C:
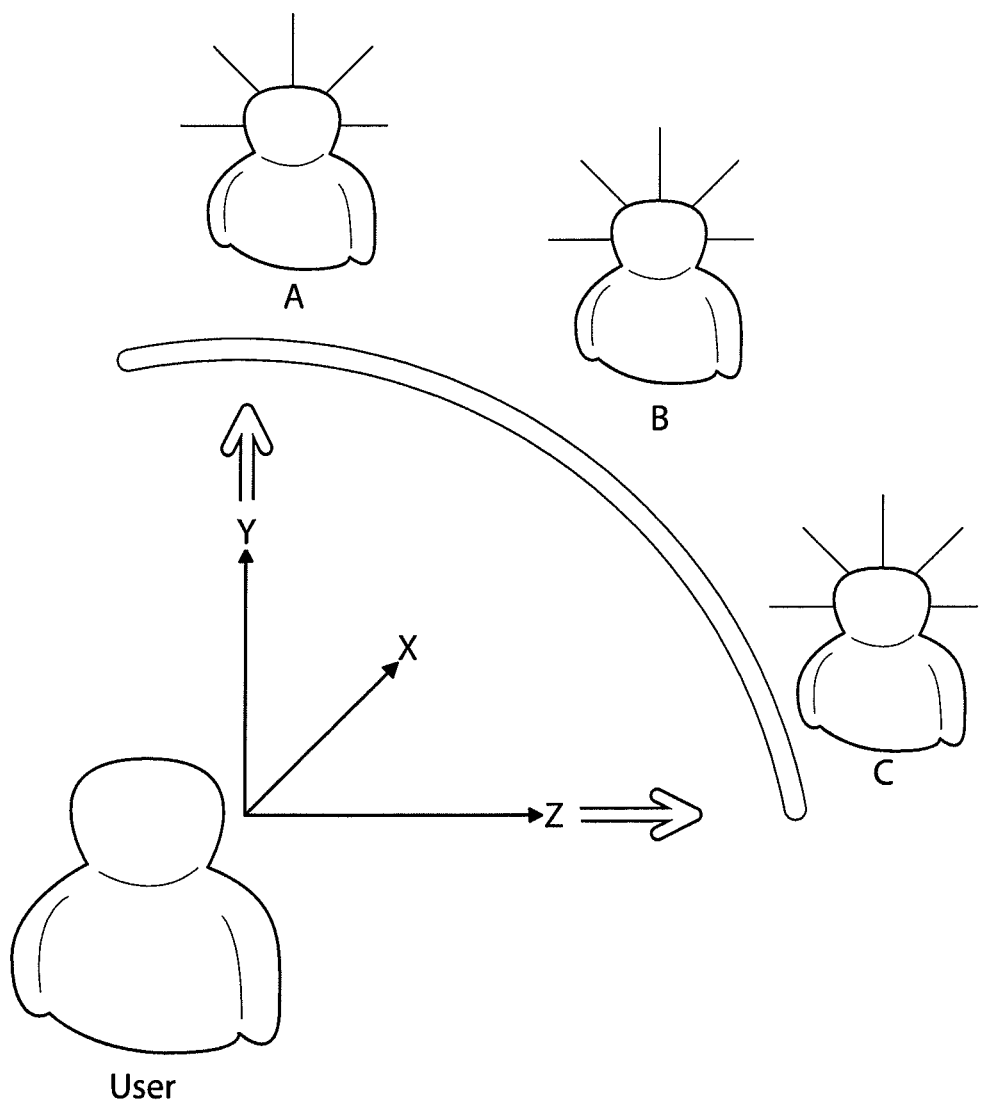

Different implementations of the wave gesture described above may be used to modulate the number of people to be detected in proximity to the apparatus 50. Referring to FIGS. 17A-17C, for example, the sweep gesture shown in FIG. 6 may be adjusted by the user to achieve a wider or narrower coverage area 120, corresponding to potentially detecting a greater number of proximate devices (for a wider coverage area) or a smaller number of proximate devices (for a narrower coverage area). Thus, by increasing the distance d between the starting point of the sweep gesture (position A) and the ending point of the sweep gesture (position C) along the z-axis, a wider coverage area 120 can be achieved as depicted in FIG. 17B, and a potentially larger group of proximate devices may be detected, depending on how many devices are in the vicinity. This may be thought of as a change in signal intensity the y-z plane.

Figure 18A:
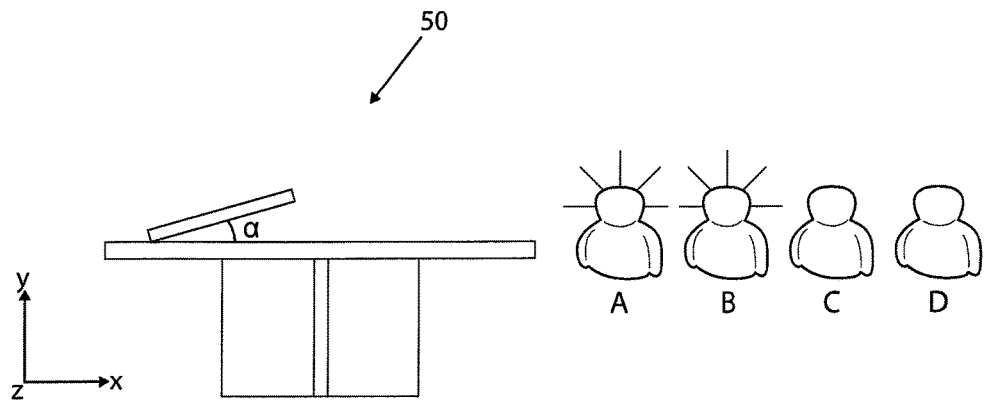
FIGS. 18A-18C illustrate implementations of a wave gesture incorporating different tilt angles according to an example embodiment of the present invention.
Figure 18B:
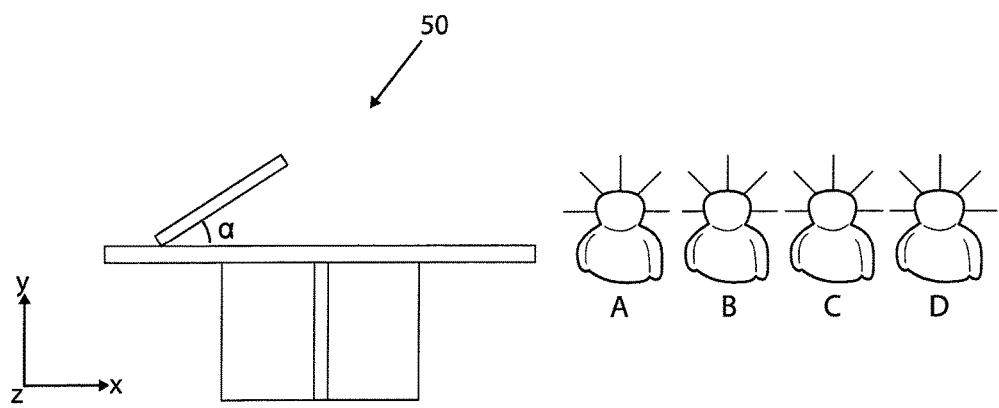
Figure 18C:
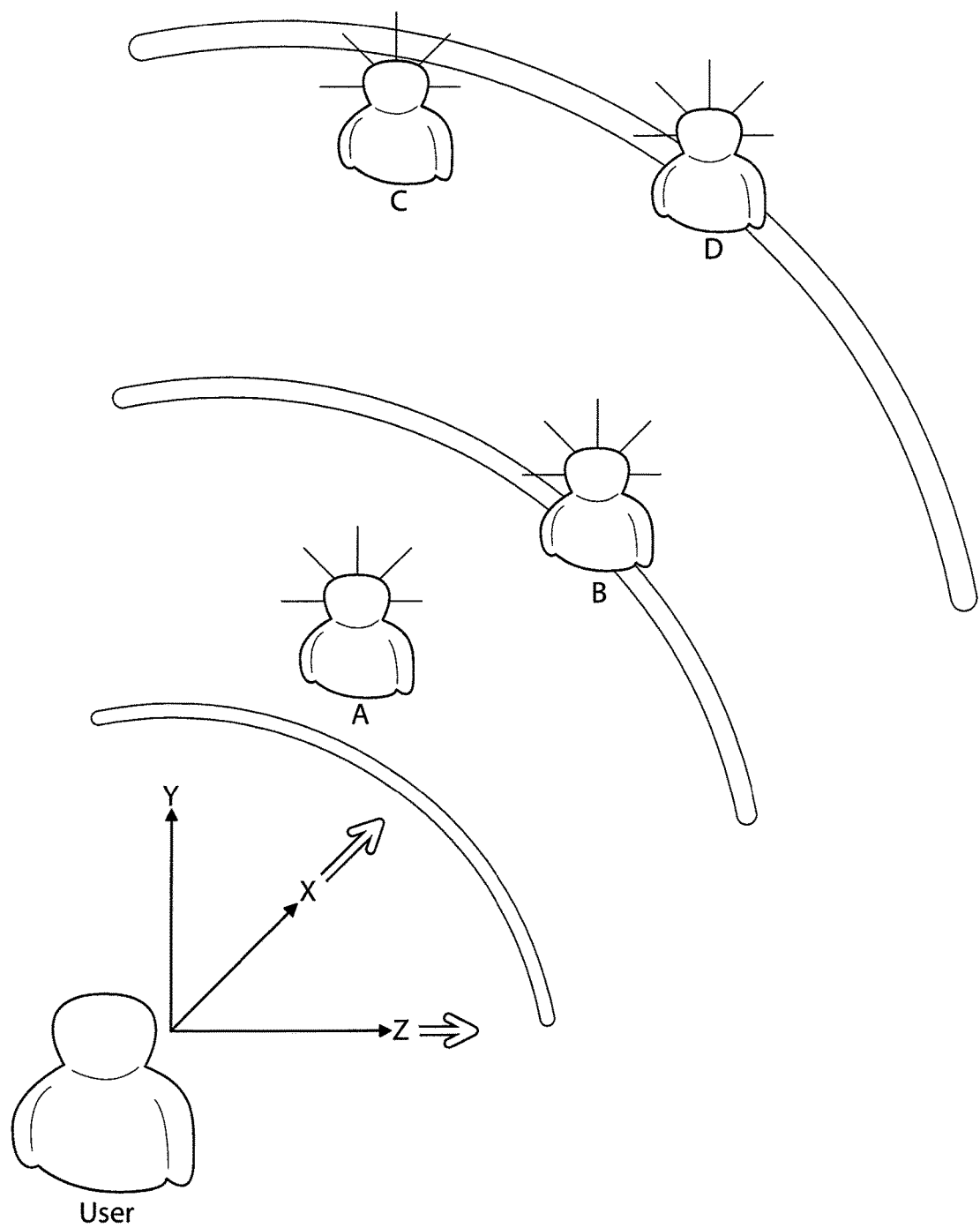

Another way to modulate the number of people to be detected may be to adjust the angle $\alpha$ of the wave gesture (shown in FIG. 5A) to increase the depth of the coverage area that is scanned (e.g., to detect additional devices at a greater distance from the user in the x-direction). With reference to FIGS. 18A-18C, for example, the smaller tilt angle $\alpha$ shown in FIG. 18A may correspond to a scanning depth in the x-direction that would detect the devices of Users A and B, but would not detect the devices of users past User B, such as Users C and D. When the tilt angle $\alpha$ is increased, as shown in FIG. 18B, however, the scanning depth may also be increased, such that the devices of Users A, B, C, and D are all detected. In some cases, the apparatus 50 may provide for an increase in the signal strength from the directional antennas described above with reference to FIG. 3 upon detection of a certain tilt angle $\alpha$ (such as an angle $\alpha$ that is above a certain threshold or within a certain range of angles). The strength of the signal may correspond to the effective depth of scanning that is accomplished. Thus, in FIG. 18A, the signal strength for detecting proximate devices may be relatively weaker than the signal strength provided by the apparatus 50 in FIGS. 18B and 18C due to the relative tilt angles $\alpha$ achieved by the user of the apparatus in performing the wave gesture. In this way, the user may control the depth of scanning conducted by the apparatus so as to save time and/or energy (e.g., power consumption of the apparatus), such as in cases in which the user only wishes to detect the devices associated with a certain user seated across a table from him and does not want to detect others who may be present in the vicinity (e.g., in the same room, but not at the user's table). This may be thought of as a change in signal intensity the x-z plane.

Figure 19A:
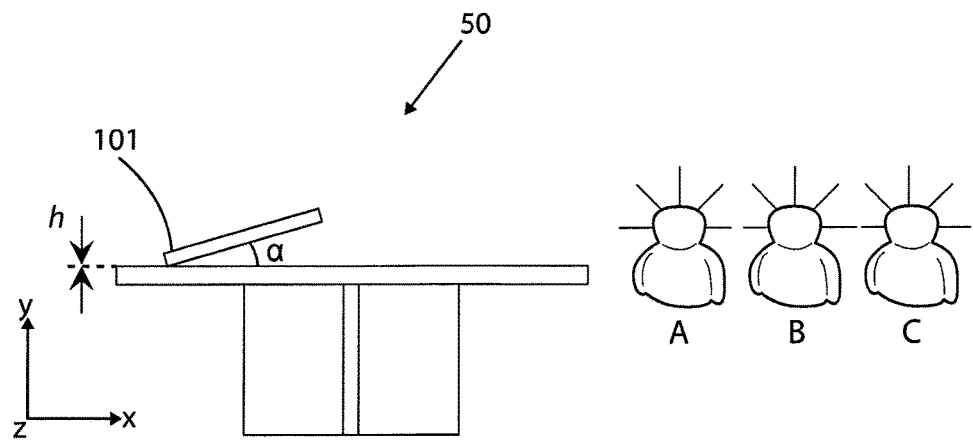
FIGS. 19A-19C illustrate implementations of a wave gesture incorporating different height components according to an example embodiment of the present invention.
Figure 19B:
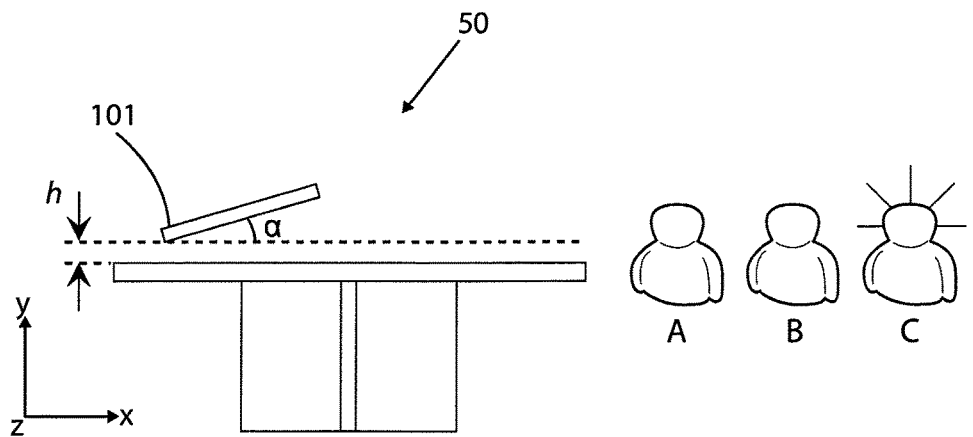
Figure 19C:
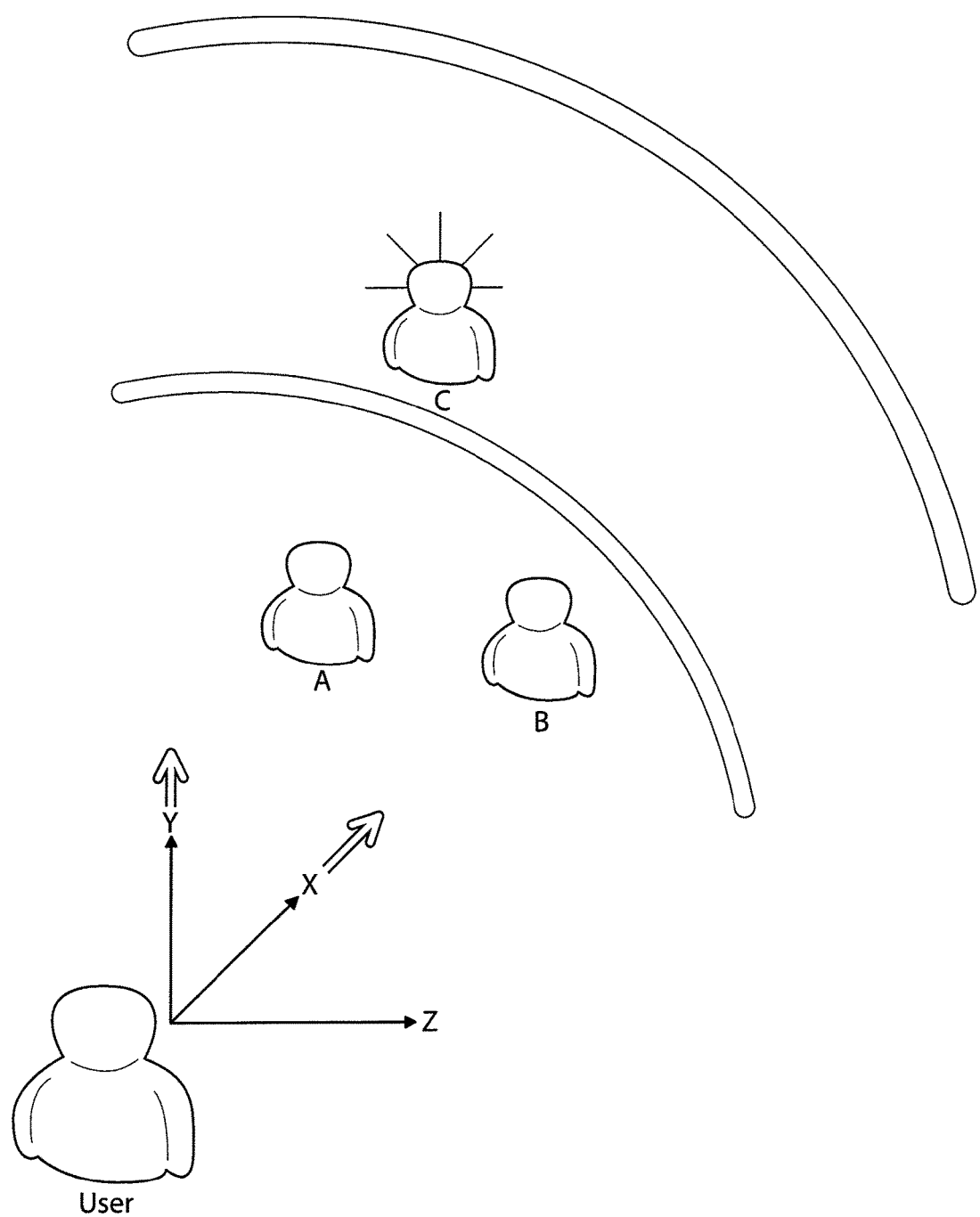

In still other cases, the user of the apparatus 50 may wish to "skip over" the devices of certain users who may be physically closer to the apparatus and may only want to detect devices that are farther away (but still proximate). In such cases, the user may modify the wave gesture to add a height component, as shown in FIGS. 19A-19C. For example, in performing a wave gesture using a particular tilt angle α with the pivot edge 101 of the device at a height h of 0 with respect to a reference plane (such as a table top), three users (Users A, B, and C) may be detected in the proximity of the apparatus 50, as depicted in FIG. 19A. The user of the apparatus 50 may, however, only wish to detect User C and may, in effect, want to exclude Users A and B from being detected. In this case, as shown in FIGS. 19B and 19C, the user may raise the apparatus 50 to a certain height h above the reference plane (in the y-direction), which may trigger the apparatus to disregard devices that it detects within a certain distance of the user (such as within 3 feet of the user's apparatus, as an example) and to only report the detection of devices in the remainder of the coverage area (such as between 3 feet from the user and the farthest distance to which the scanning extends). Thus, in contrast with the case described with respect to FIGS. 18A-18C, a selective depth of scanning may be achieved to focus on particular devices that the user may consider more relevant to a particular operation to be performed. This may be thought of as a change in signal intensity the x-y plane.

The various implementations of the wave gesture described above may be combined in some cases to facilitate the detection of certain devices proximate the user's apparatus 50. For example, a larger sweep gesture (shown in FIG. 17B-17C) may be combined with a wave gesture that includes a height component h greater than 0 (shown in FIG. 19B-19C) so as to increase the width of the coverage area 120 to detect additional (but perhaps relatively peripheral) devices proximate the apparatus, but at the same time excludes those users that are physically nearest to the apparatus. Likewise, a larger sweep gesture (shown in FIG. 17B-17C) may be combined with a wave gesture having an increased tilt angle α (shown in FIG. 18B-18C) to detect devices in a wider coverage area and both near the apparatus and at a relatively greater distance from the apparatus within the coverage area, without excluding any detected devices.

Regardless of the particular wave gesture used, the at least one memory and the computer program code may be configured to, with the processor, cause the apparatus 50 to provide for communication with at least one selected device of the one or more devices that are determined to be proximate the apparatus. For example, with reference to FIG. 7, the User's apparatus may detect five devices that are in the coverage area 120 of the apparatus. In the depicted example, the users associated with those five devices may be Al, Bonnie, Carl, Donna, and Eve. Fred's device and Gary's device may fall outside the coverage area 120 and may thus not be detected in this example. The User may communicate with one or more of the detected devices by selecting those detected devices with which the User wishes to communicate, such as by providing input via a touch display of the device 100 selecting representations of one or more of the detected devices, as described in greater detail below. The communication may be accomplished automatically (e.g., without further user input) upon selection of the one or more detected devices using mechanisms such as peer-to-peer and cloud-based technology.

Various types of communication may be possible with one or more of the selected devices. For example, the at least one memory and the computer program code may be configured to, with the processor, cause the apparatus to provide for communication with at least one selected device by providing for content to be shared with the at least one selected device. Referring to the depicted example of FIG. 7, the User may wish to share content with the detected device associated with Eve. For example, the User may wish to share photos stored on or accessible to the User's device with Eve's device so that Eve may view the same photos on her own device display, rather than having to look at the User's device display.

In still other embodiments, the at least one memory and the computer program code may be configured to, with the processor, cause the apparatus 50 to receive an indication from at least one of the one or more devices determined to be proximate the apparatus 50 and to provide for communication with the at least one device from which the indication is received. In other words, the detection of devices proximate the apparatus may, in some cases, include a bi-directional component, in which the user of the other device must also detect the apparatus 50 and, in a sense, agree to the communication by detecting and acknowledging the proximity of the apparatus 50.

Figure 7:
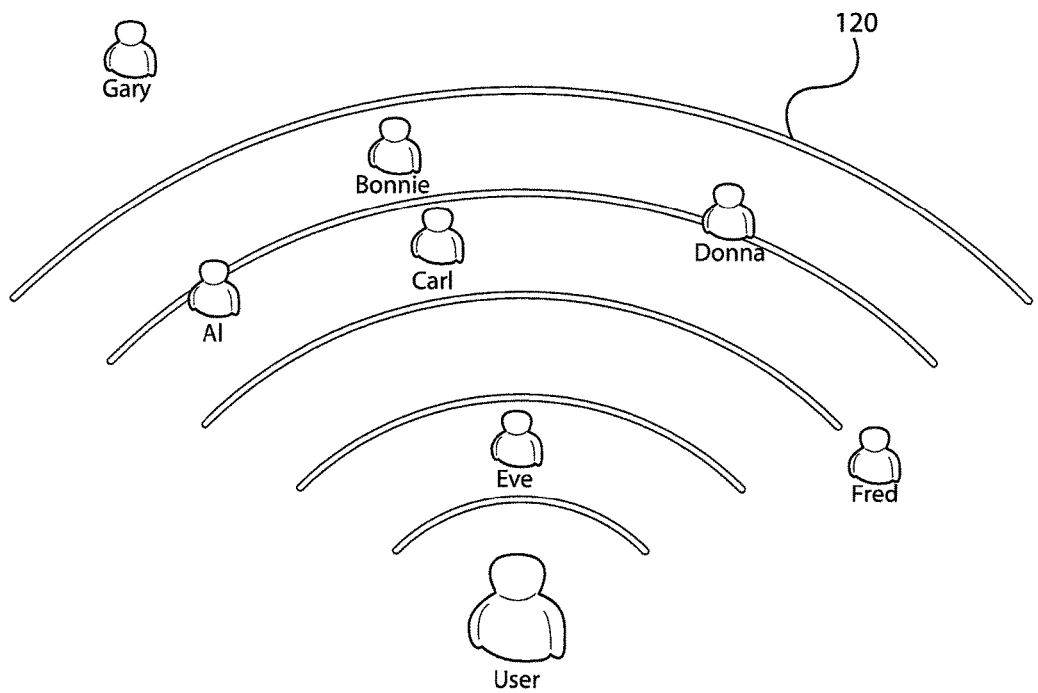
FIG. 7 illustrates devices proximate the user's apparatus inside and outside a coverage area of the apparatus according to an example embodiment of the present invention.

With reference to FIG. 7, for example, in the bi-directional scenario, in addition to the User initiating a wave gesture of the User's device, Eve would also implement a wave gesture using her device, and as such the User's device would receive signals transmitted by the antennas on the apparatus associated with Eve's device for detecting the User's proximity to Eve's device. In this case, the User's apparatus would be caused to provide for communication with Eve's device upon receiving such an indication (e.g., the detection signals) from Eve's device, and at the same time Eve's device may be configured such that Eve's apparatus would also be able to communicate (e.g., share content) with the User's device.

The detection of devices proximate the apparatus 50, such as via a wave gesture in the embodiments described above, may facilitate the execution of various operations, including the selection of devices determined to be proximate the apparatus from among user devices that are included in predefined distribution groups and the creation of user groups for communicating data with such devices.

According to some embodiments, for example, the at least one memory and the computer program code may be configured to, with the processor, cause the apparatus 50 to access a predefined distribution list (e.g., a distribution list that has already been established and stored by the user of the device embodying the apparatus or that is accessible to the apparatus), and determine a subset of the distribution list based on a common characteristic of members of the subset. The at least one memory and the computer program code may be further configured to, with the processor, cause the apparatus 50 to receive selection of the distribution list and provide for communication with members of the subset based on receipt of the selection. Accordingly, non-members of the subset (e.g., members of the distribution list who do not share the common characteristic) would be excluded from the communication. In other words, distribution lists that have already been configured may be leveraged according to embodiments of the invention to facilitate the representation of a group (e.g., the group being a subset of a particular distribution list that is co-located with the user in some cases).

Figure 8:
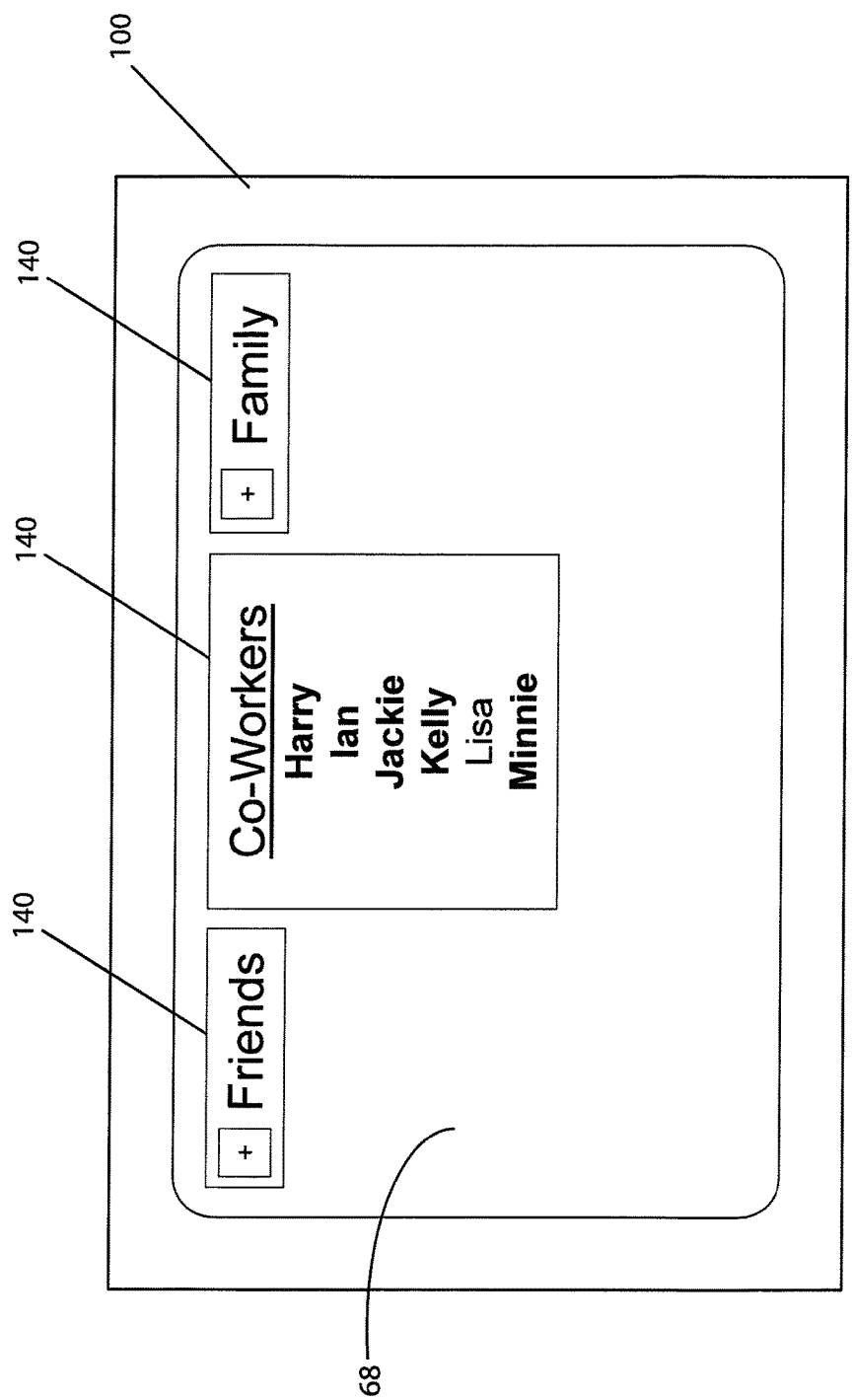
FIG. 8 illustrates an apparatus presenting accessed distribution lists on a display according to another example embodiment of the present invention.

With reference to FIG. 8, for example, the user of a device embodying the apparatus 50 may have access to several distribution lists that have already been defined, such as the distribution lists called "Friends," "Co-Workers," and "Family" in the depicted example. The distribution list 140 called "Co-Workers," which is expanded in FIG. 8, may include six members: Harry, Ian, Jackie, Kelly, Lisa, and Minnie. Of those members of the distribution list, certain members may share a common characteristic and may thus form a subset of the list.

In some embodiments, the common characteristic may include a proximity of a device associated with the member of the subset to the apparatus. For example, Harry, Ian, Jackie, Kelly, and Minnie may all be attending a meeting with the user of the apparatus 50 and may, thus, be co-located with the user. Accordingly, the common characteristic may be their co-location with the user, which may be determined via a wave gesture as described above with respect to FIGS. 3-7. In other embodiments, however, the common characteristic may comprise the inclusion of the member of the subset in a predefined group of contacts. For example, the user may have previously included Jackie, Kelly, Lisa, and Minnie in a predefined group of contacts (e.g., the user may have previously defined those members as some of his contacts due to associations with those members outside of work). In still other embodiments, the common characteristic may comprise the inclusion of the member of the subset in an established communication session. Going back to the meeting example, the user may have a communication session (such as a web meeting session) running with the participants in the meeting, including participants who are co-located with the user and those participating from remote locations. The members of the subset in this example may thus include anyone from the "Co-Workers" distribution list who is logged on to the same web meeting (e.g., anyone participating in the meeting via the web meeting session, regardless of physical location).

In some cases, the at least one memory and the computer program code may be configured to, with the processor, cause the apparatus 50 to provide for a visual indication of the subset that is determined. In embodiments in which the common characteristic is proximity to the apparatus, for example, each member of the subset associated with a device that has been determined to be proximate the user's apparatus (e.g., those co-located with the user, noted above as including Harry, Ian, Jackie, Kelly, and Minnie in the depicted example of FIG. 8) may be indicated visually on the display 68. The visual indication may be, for example, a difference in font (e.g., bold, italics, highlighting, a different color, etc.) or the use of a particular icon or symbol near each member of the subset, such as a "+" or a "person" icon. In the depicted example, the name of each member of the subset (e.g., each user associated with a device that is determined to be proximate the user's device) is indicated via bold font. As a result, the user of the apparatus 50 may be able to tell at a glance which members of the distribution list 140 are proximate the user's apparatus in this example and are, thus, members of the subset.

The at least one memory and the computer program code may be configured to, with the processor, cause the apparatus 50 to provide for communication with the members of the subset by sharing content with members of the subset. For example, the user of the apparatus 50 may be able to share content with the members of the subset only (e.g., excluding non-members of the subset, such as Lisa in the previous example) based on receipt of the selection of the whole distribution list 140. In other words, when the user selects the "Co-Workers" distribution list as recipients of shared content, only members of the subset, and no one else in the distribution list, would receive the shared content in this example. In other embodiments, the communication provided for may include the transmission of a message (such as a text or voice message), a phone call, or any other form of communication.

In still other embodiments, the at least one memory and the computer program code may be configured to, with the processor, cause the apparatus 50 to access the predefined distribution list (or lists) based on a context of use of the apparatus. For example, if the user is logged on to a work account, the apparatus 50 may access distribution lists associated with the user's work, such as the "Co-Workers" distribution list, but possibly not the "Friends" distribution list (e.g., if none of the "friends" on the list are co-workers) and possibly not the "Family" distribution list (e.g., if none of the "family" on the list are co-workers). As another example, the apparatus 50 may only access predefined distribution lists that have at least one member that has been determined to be proximate the user's apparatus 50 (e.g., through the use of a wave gesture as described above). In this case, the three distribution lists 140 shown in FIG. 8 may each have been determined to include at least one member who is co-located with the user and, thus, has been determined to be proximate the user's apparatus.

In some cases, the time of day and/or location of use of the device associated with the apparatus may inform which distribution lists are accessed. For example, if a particular user frequently shares documents with two of his co-workers (e.g., Ian and Kelly) in a meeting, the location and frequency of the usage (e.g., the sharing events) may be stored for Ian and Kelly. In this way, the next time a meeting takes place involving Ian and Kelly in this example, the distribution list including Ian and Kelly may appear to the user as having a higher priority, or being more relevant, than other distribution lists including other members of the meeting who may be present. In addition, if the user is in close proximity to Ian and Kelly outside the meeting environment, for example in a cafeteria, but the user does not have a history of sharing any content with Ian and Kelly in that location, the distribution list created with the meeting location context may not appear as a high priority distribution list for the user.

With respect to the time of day, and as another example, a user may like to watch television when he comes home from work every night. The user may find it easier to search for television shows on his mobile phone and then transfer the content to his big screen television. The apparatus may "learn" that content is transferred from the user's mobile device to the television only at a certain time of the day (e.g., after 6 PM), and as a result the television may appear as a distribution list for the user only at that time of day.

In addition to enabling the user to communicate with only certain members of an established distribution list (e.g., members who are co-located with the user), the determination of devices proximate the user's apparatus, such as via a wave gesture as described above, may further facilitate the creation of groups of the user's contacts with whom information can be exchanged.

Figure 9:
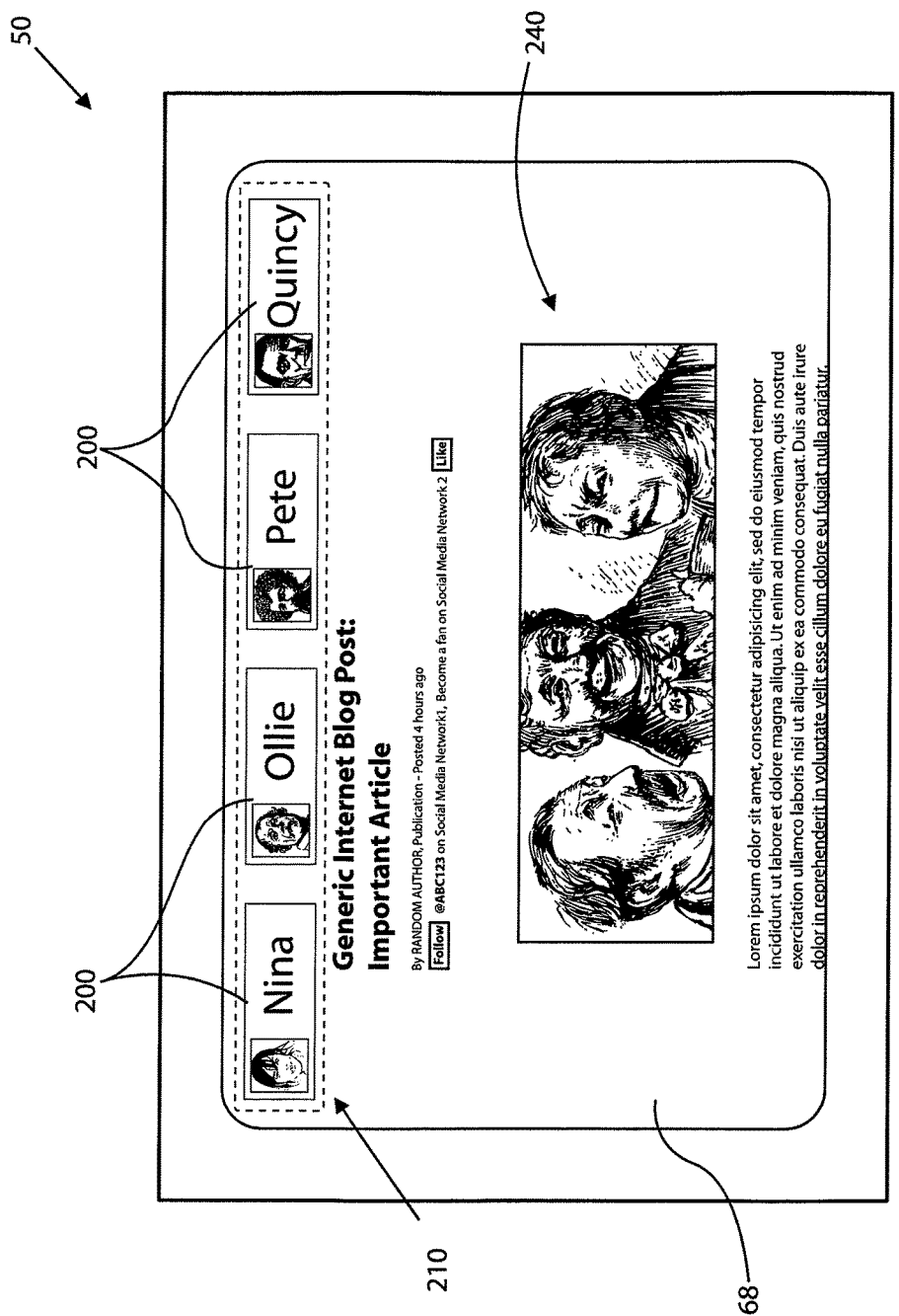
FIG. 9 illustrates an apparatus presenting visual representations of users in a first region according to another example embodiment of the present invention.

Accordingly, in some embodiments, the apparatus 50 may comprise at least one processor and at least one memory including computer program code, and the at least one memory and the computer program code may be configured to, with the processor, cause the apparatus 50 to provide for presentation of one or more visual representations 200 in a first region 210 of a display 68, as shown in FIG. 9. Each visual representation 200 may be associated with a user. For example, in the depicted example, four visual representations 200 are visible in the first region 210 for Nina, Ollie, Pete, and Quincy, each of whom may be a user of a device and, for example, one of the contacts previously defined by the user of the apparatus 50.

Figure 10:
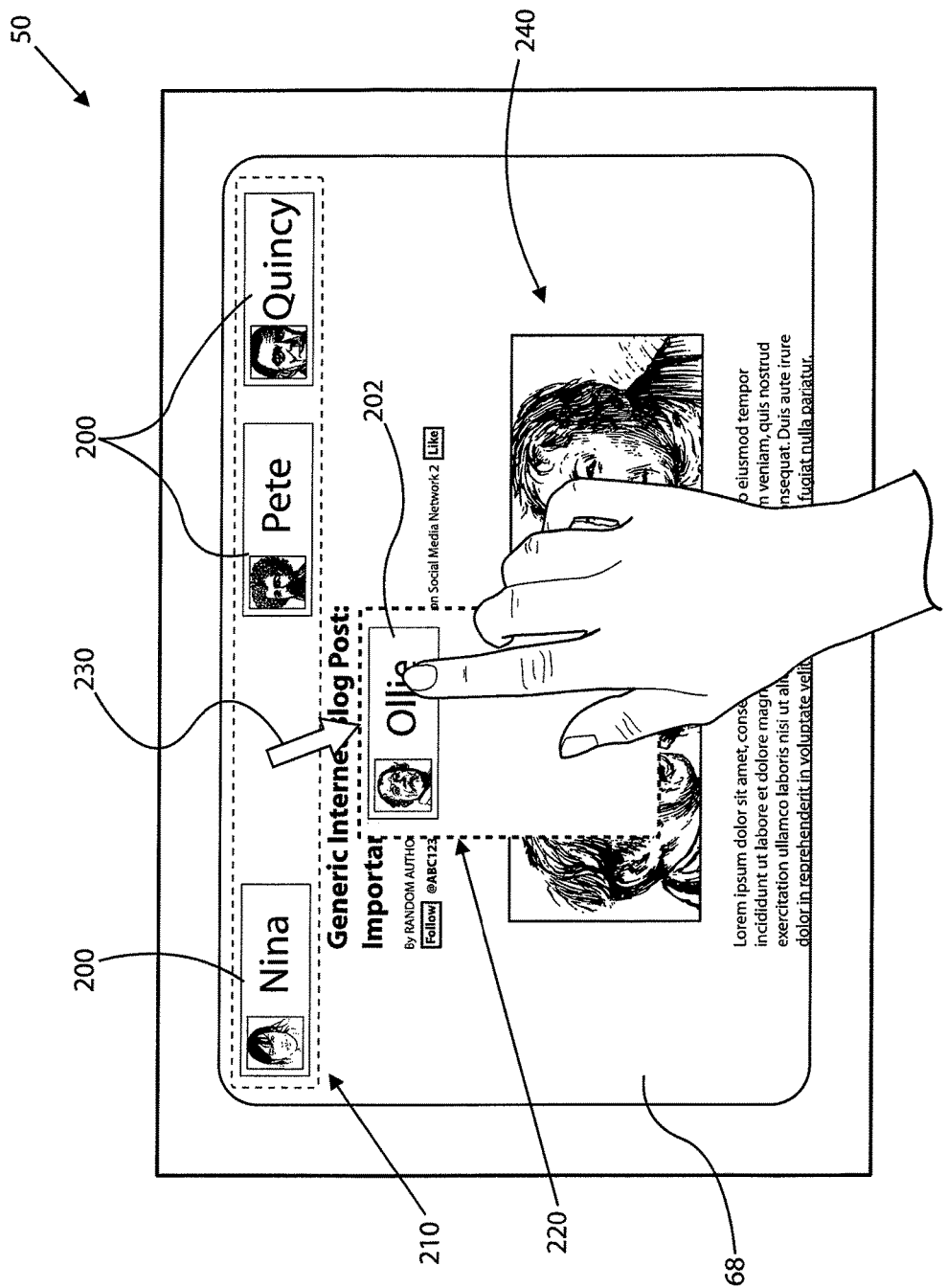
FIG. 10 illustrates the apparatus of FIG. 9 in which an input is received moving a selected visual representation outside the first region according to an example embodiment of the present invention.

With reference to FIGS. 9 and 10, the at least one memory and the computer program code may be further configured to, with the processor, cause the apparatus 50 to receive an input moving a selected visual representation 202 to a location outside of the first region 210 and to designate an area 220 of the display 68 corresponding to the location to which the selected visual representation 202 is moved for creating a group of users in response to receipt of the input. For explanatory purposes, the first region 210 and the designated area 220 are shown in dashed lines, and the input moving the selected visual representation 202 is illustrated using a block arrow 230.

As depicted, for example, the user of the apparatus 50 may be viewing content 240, such as a news article, on the display 68 of the device, and the first region 210 in which visual representations 200 of at least some of the user's contacts are displayed may be located along a top edge of the display. The first region 210 may, however, be disposed in any location on the display based on the content with which the user is interacting, the user's preferences, and/or other considerations. In some cases, the visual representations 200 may at least partially overlay the content 240 with which the user is interacting. In this regard, the movement input 230 (a dragging input) provided by the user (e.g., by the user's finger as depicted or some other implement or input device) may serve to move the selected visual representation 202 from the first region 210 to a location outside the first region.

The location to which the selected visual representation 202 is moved may be unassociated with the execution of any particular operation related to communication of information or contacts. In other words, the user may drag the selected visual representation 202 from the first region 210 to some other, previously undesignated location on the display 68, and the act of moving the selected visual representation 202 outside of the first region may trigger the designation of the area 220 to which the selected visual representation is moved as an area for accumulating one or more selected visual representations and for creating a group of users. Accordingly, the designated area 220 may be an area that overlays the content 240 with which the user is interacting, as shown in FIG. 10, or a new window that is presented in a portion of the display 68.

Figure 11:
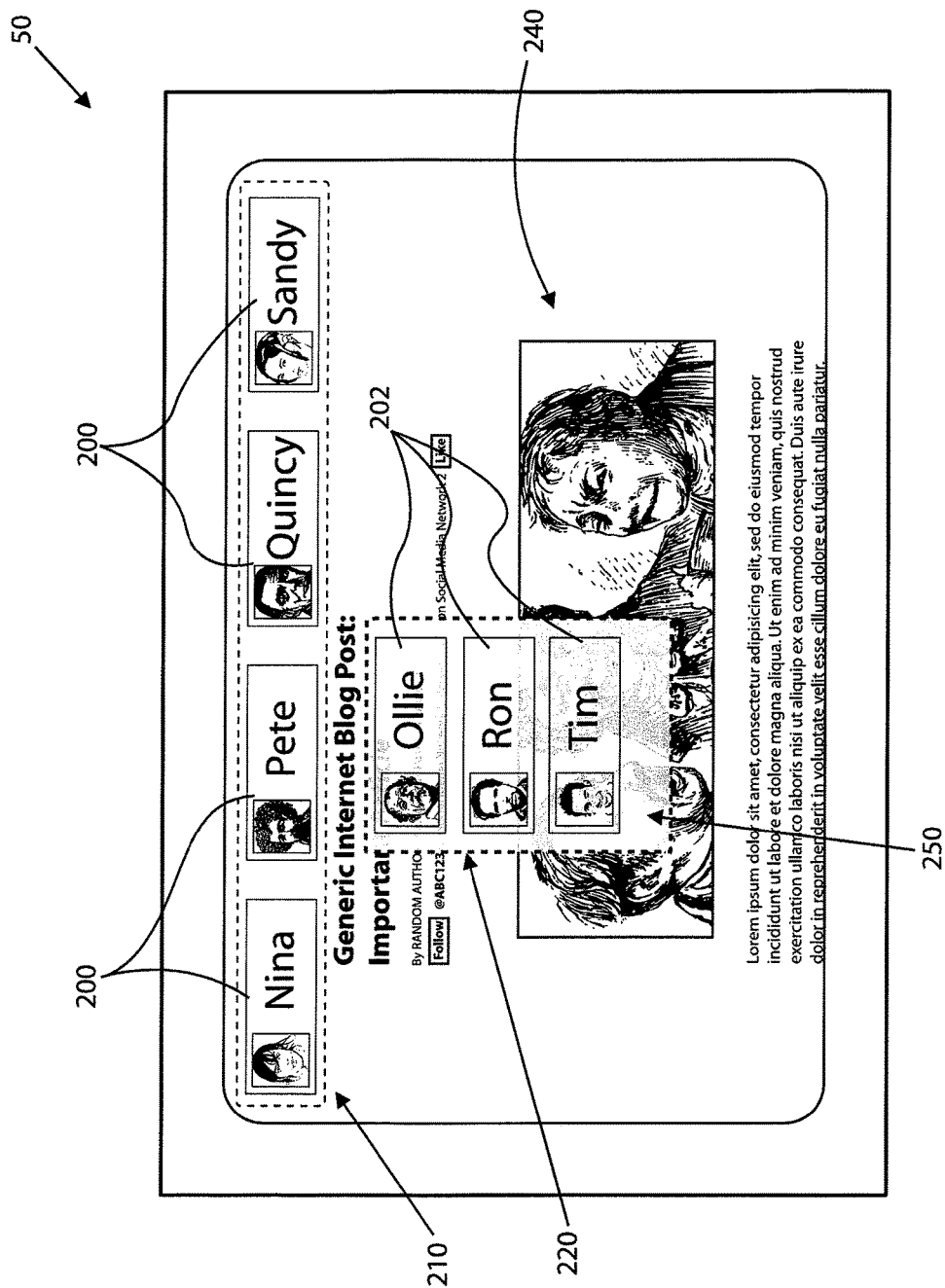
FIG. 11 illustrates the apparatus of FIG. 9 in which multiple inputs are received moving multiple selected visual representations to a designated area according to an example embodiment of the present invention.

In some cases, the at least one memory and the computer program code may be configured to, with the processor, cause the apparatus 50 to receive a plurality of inputs (e.g., a plurality of dragging inputs), with each input moving a selected visual representation 202 to the designated area 220. A group of users may thus be created based on receipt of the inputs. In the example depicted in FIG. 11, three inputs have been received moving three selected visual representations 202 out of the first region 210 to the designated area 220. As a result, a user group 250 is created that includes three members: Ollie, Ron, and Tim. In some embodiments, as illustrated, the visual representations 200 provided in the first region 210 may be arranged to include additional visual representations as a selected visual representation 202 is moved out of the first region 210 to allow the user to view additional contacts for selection, for example. Moreover, the user may be able to scroll through the visual representations 200 displayed in the first region 210 using, for example, a swipe gesture applied to the first region, to move the list to the right or to the left and to view additional contacts that may be located outside the viewing area of the first region.

Once the user is satisfied with the user group 250 that has been created, the user may be able to communicate information to the user group as a whole (e.g., each member of the user group). For example, the user may be able to share content (e.g., the content 240) with all of the members of the user group 250 using a single input, such as by applying a touch input to the display 68 that serves to move the content 240 presented on the display to the visual representation of the user group in the designated area 220. In some cases, however, the information may be communicated with one or more particular members of the user group (e.g., less than all members of the user group) by selecting particular members of the user group as recipients.

Figure 12:
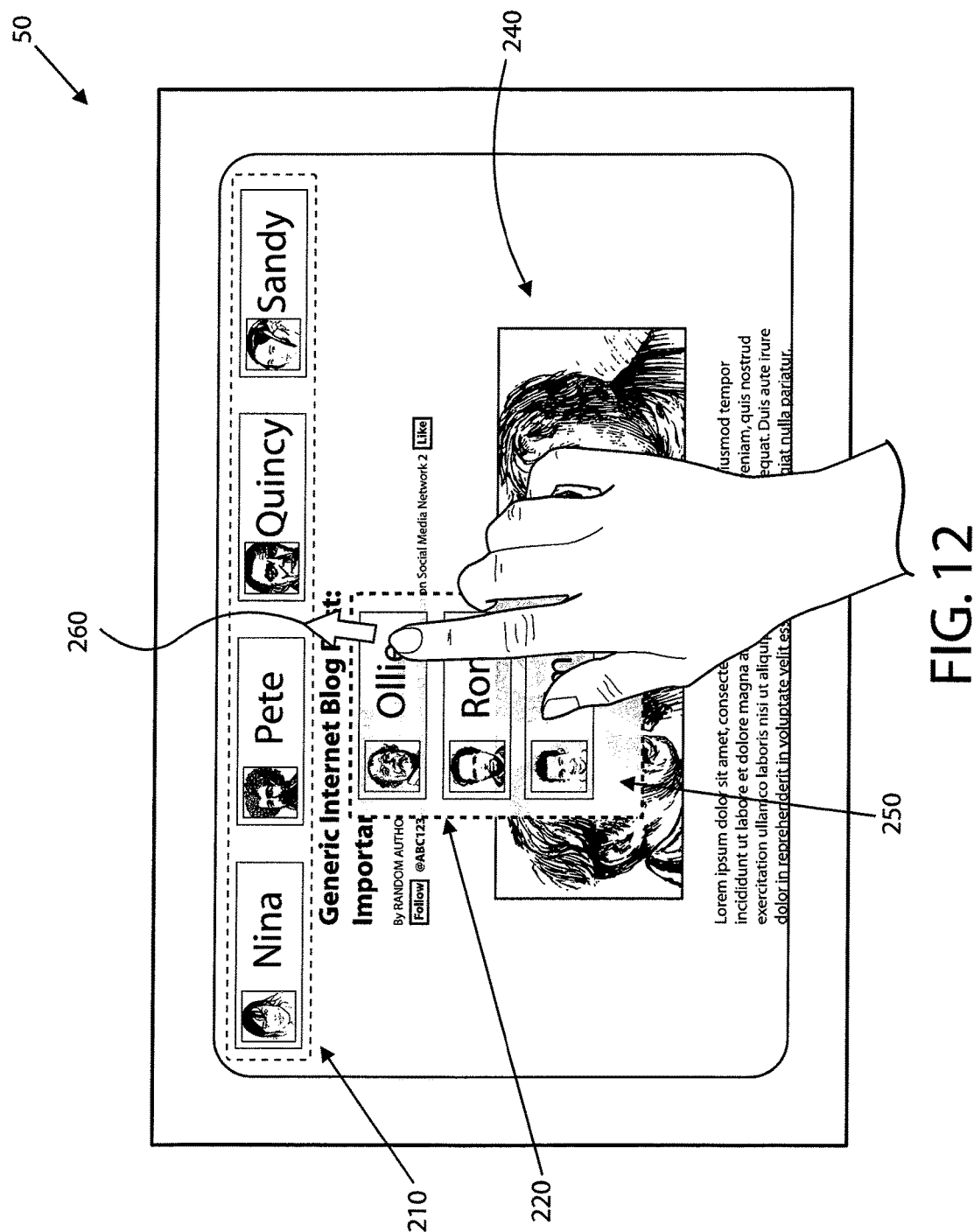
FIG. 12 illustrates the apparatus of FIG. 9 in which an input is received moving the selected visual representations from the designated area to the first region according to an example embodiment of the present invention.
Figure 13:
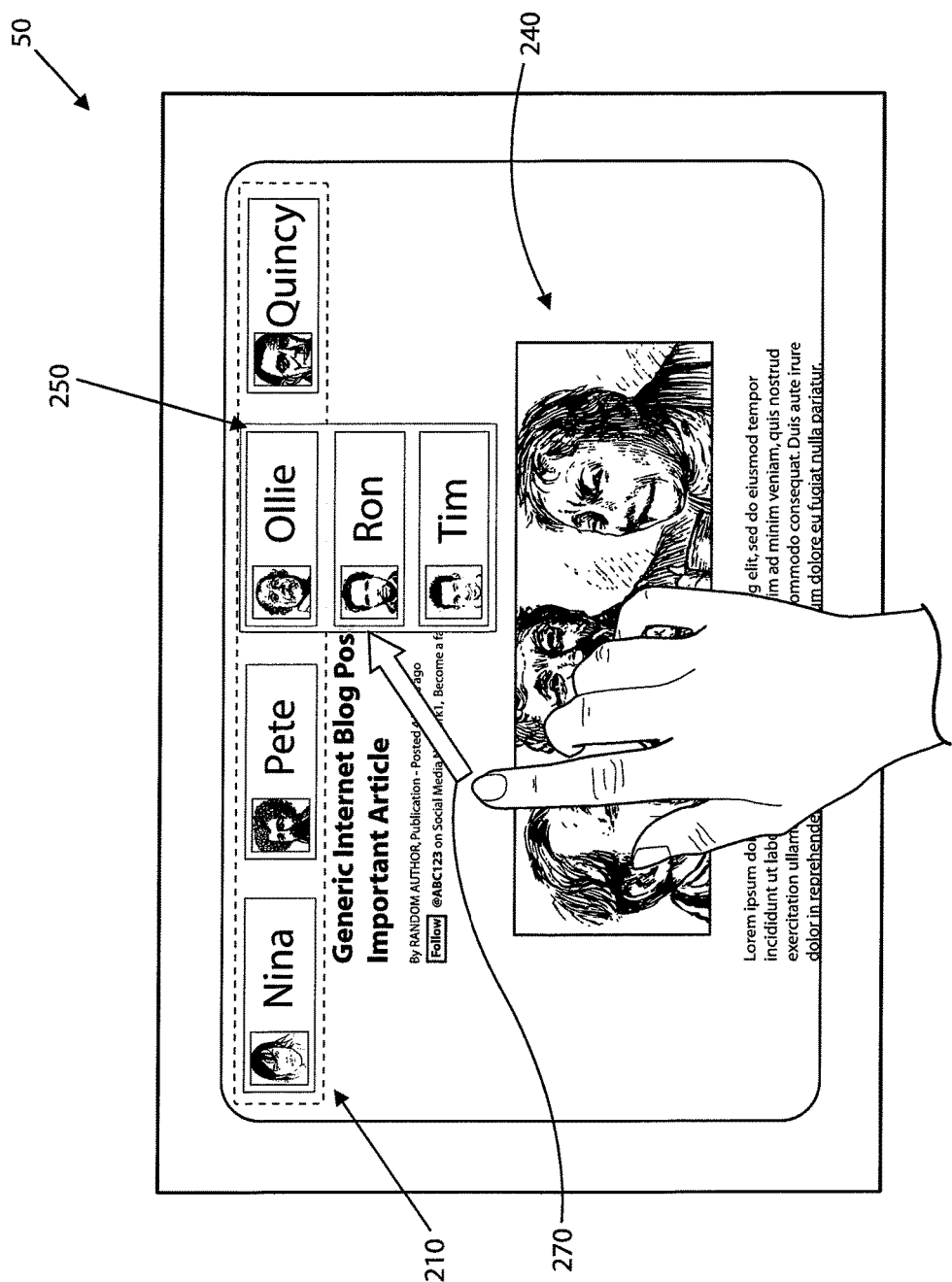
FIG. 13 illustrates the apparatus of FIG. 9 in which an input is received sharing content with the created user group according to an example embodiment of the present invention.

In some embodiments, the at least one memory and the computer program code may be configured to, with the processor, cause the apparatus 50 to receive an input 260 moving the selected visual representations 202 from the designated area 220 to the first region 210, thereby including the user group 250 as a single "contact" represented in the first region, as shown in FIGS. 12 and 13. The user may then be able to share the content 240 or otherwise communicate with the user group 250 as a whole by applying an input 270 that moves the content to the location in the first region 210 corresponding to where the user group 250 has been placed, as shown in FIG. 13. Furthermore, in some embodiments, the at least one memory and the computer program code may be configured to, with the processor, cause the apparatus 50 to store the group of users 250 that has been created in a memory, such as the memory 76 shown in FIG. 2. Accordingly, the user may be able to access a created user group 250 similarly to how the user may access any other contact stored on the device during subsequent interactions.

Referring again to FIG. 9, in some cases, the at least one memory and the computer program code may be configured to, with the processor, cause the apparatus 50 to provide for presentation of the one or more visual representations 200 in the first region 210 based on a relevancy of each associated user to an operation to be executed. For example, the relevancy may be based on proximity of the associated user to the apparatus 50. In the depicted example of FIG. 9, for instance, Nina, Ollie, Pete, and Quincy may be presented on the display in the first region 210 from among several other available contacts based on these four users being associated with devices that have been determined to be proximate the user's apparatus 50 (e.g., as described above with respect to the wave gesture and FIGS. 3-7). As another example, the relevancy may be based on prior interaction with the associated user with respect to the operation to be executed. For example, users associated with devices with which the user has previously shared content may be considered more relevant than other users with whom content has never been shared.

Alternatively or additionally, the visual representation 200 associated with the most relevant users (e.g., the users most proximate to the apparatus 50) may be visually distinguished from other visual representations, such as through increased size of the visual representation, different coloring or opacity of the visual representation, position in the first region 210 (e.g., most relevant being centrally located), the inclusion of a pictorial representation of the location of the user and/or the time of day, and so on. In this way, the user may be able to tell at a glance which contacts are most relevant to the operation to be executed (e.g., a sharing content), and selection from among the user's contacts may be facilitated.

Figure 14:
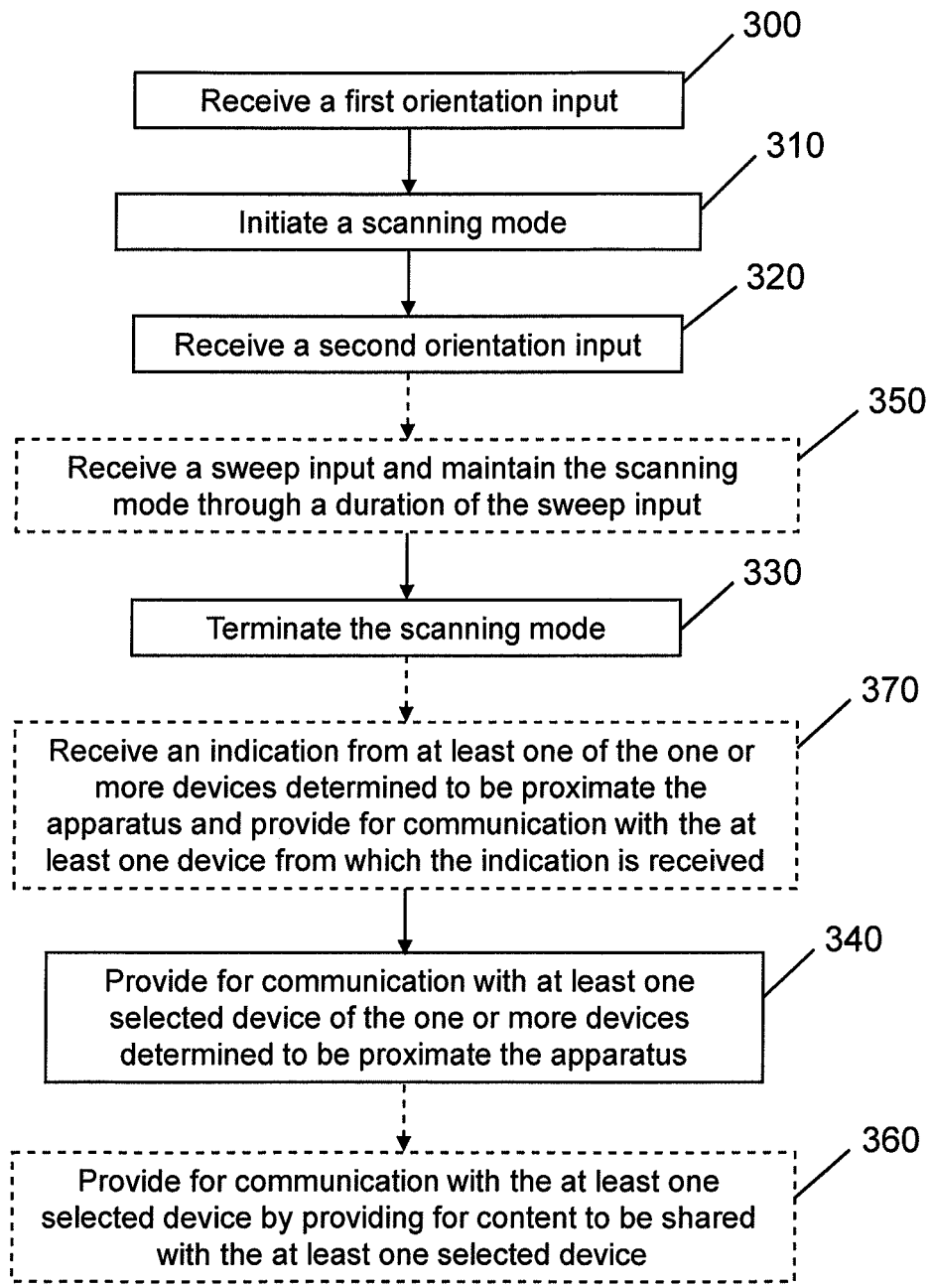
FIGS. 14-16 illustrate flowcharts of methods of providing for communication among users according to another example embodiment of the present invention.
Figure 15:
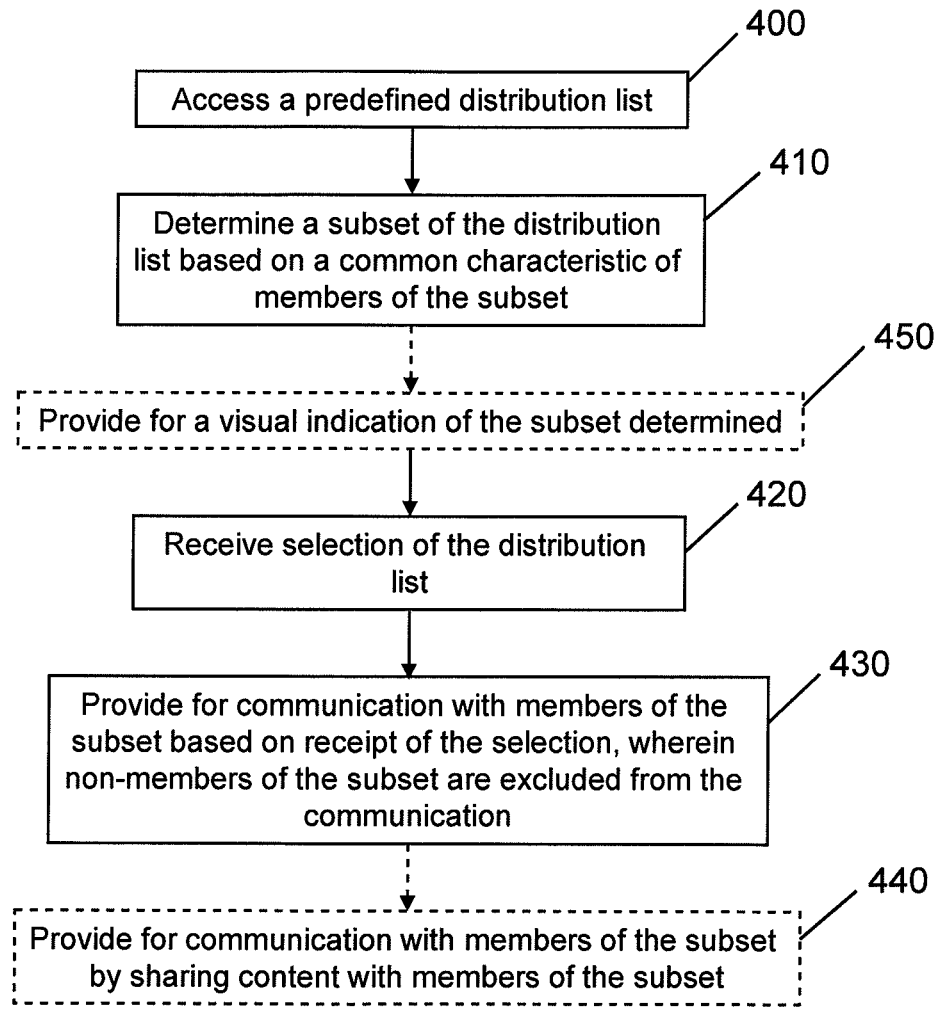
Figure 16:
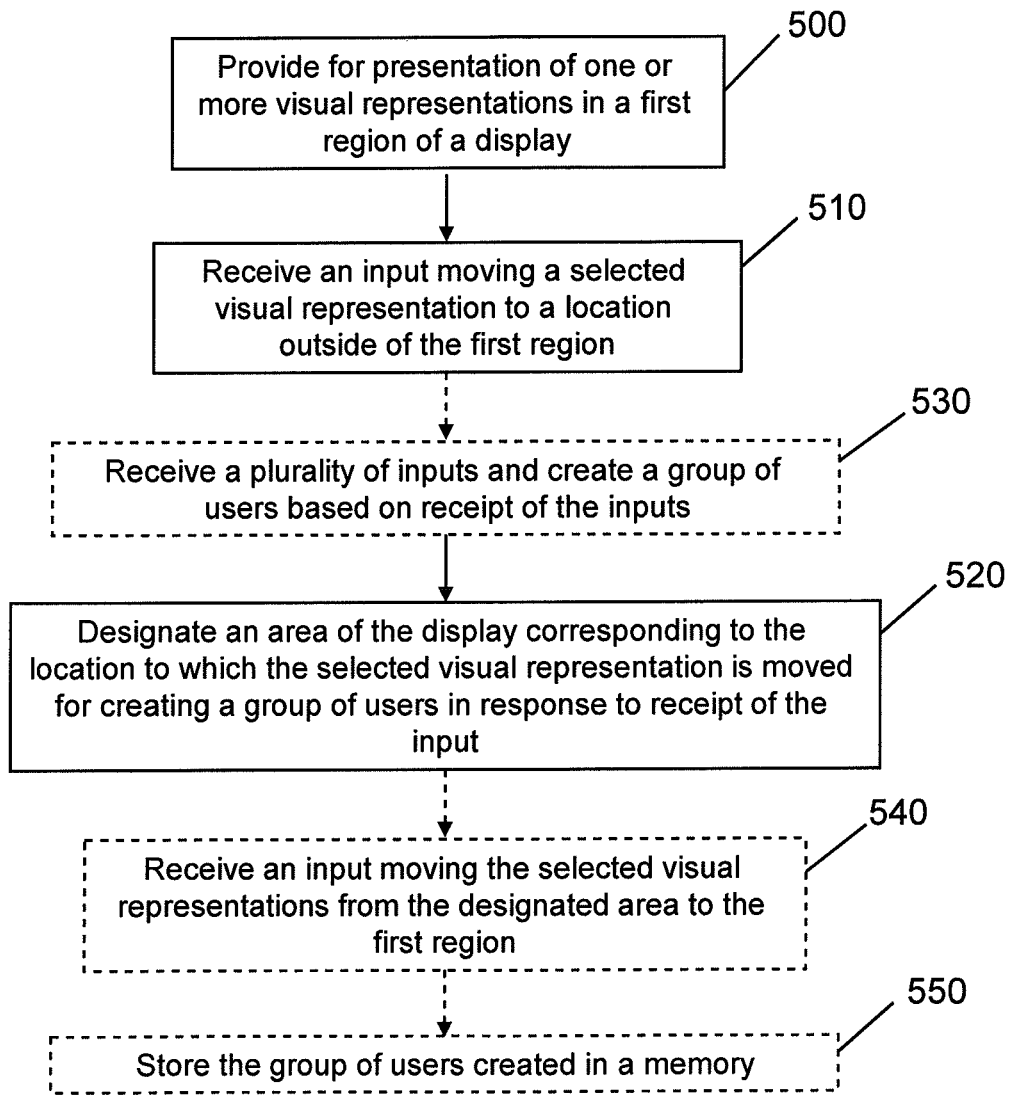

FIGS. 14-16 illustrate flowcharts of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one embodiment of a method for detecting devices proximate an apparatus, as shown in FIG. 14, includes receiving a first orientation input at Block 300 and initiating a scanning mode in response to receipt of the first orientation input during which one or more devices proximate the apparatus are determined at Block 310. A second orientation input is received that is different from the first orientation input at Block 320, and the scanning mode is terminated at Block 330 in response to receipt of the second orientation input. The first orientation input may, for example, be indicative of a tilting of a device associated with the apparatus in a first direction along a tilt plane. The second orientation input may be indicative of a tilting of the device associated with the apparatus in a second direction along the tilt plane. At Block 340, embodiments of the method provide for communication with at least one selected device of the one or more devices determined to be proximate the apparatus, as detailed above.

In some cases, for example, a sweep input may be received, and the scanning mode may be maintained through a duration of the sweep input at Block 350. The sweep input may be indicative of a rotating of the device associated with the apparatus along a sweep plane that is perpendicular to the tilt plane.

In some embodiments, as described above, the method may provide for communication with the at least one selected device by providing for content to be shared with the at least one selected device at Block 360. In addition or alternatively, an indication may be received from at least one of the one or more devices determined to be proximate the apparatus, and communication with the at least one device from which the indication is received may be provided for at Block 370.

Turning to FIG. 15, another embodiment of a method is illustrated for providing for communication using distribution lists. Embodiments of the method include accessing a predefined distribution list at Block 400, determining a subset of the distribution list based on a common characteristic of members of the subset at Block 410, receiving selection of the distribution list at Block 420, and providing for communication with members of the subset based on receipt of the selection at Block 430, where non-members of the subset are excluded from the communication. In some embodiments, the predefined distribution list may be accessed based on a context of use of the apparatus, as described above.

The common characteristic may comprise proximity between a device associated with the member of the subset and the apparatus, inclusion of the member of the subset in a predefined group of contacts, and/or inclusion of the member of the subset in an established communication session. In some cases, providing for communication with members of the subset involves sharing content with members of the subset, as shown at Block 440. In still other cases, a visual indication of the subset determined may be provided at Block 450.

Another embodiment of a method is illustrated in FIG. 16 for providing for the creation of user groups. Embodiments of the method provide for presentation of one or more visual representations in a first region of a display at Block 500, with each visual representation being associated with a user. Input moving a selected visual representation to a location outside of the first region is received at Block 510, and an area of the display corresponding to the location to which the selected visual representation is moved is designated, at Block 520, for creating a group of users in response to receipt of the input.

In some cases, providing for presentation of the one or more visual representations in the first region may be based on a relevancy of each associated user to an operation to be executed, as described above. For example, the relevancy may be based on proximity of the associated user to the apparatus, and/or the relevancy may be based on prior interaction with the associated user with respect to the operation to be executed.

Furthermore, a plurality of inputs may be received, each input moving a selected visual representation to the designated area, and a group of users may be created based on receipt of the inputs at Block 530. An input may also be received moving the selected visual representations from the designated area to the first region at Block 540, as described above. In some cases, the group of users created may be stored in a memory at Block 550.

In some embodiments, certain ones of the operations above may be modified or further amplified as described below. Furthermore, in some embodiments, additional optional operations may be included, some examples of which are shown in dashed lines in FIGS. 14-16. Modifications, additions, or amplifications to the operations above may be performed in any order and in any combination.

In an example embodiment, an apparatus for performing the methods of FIGS. 14-16 above may comprise a processor (e.g., the processor 70 of FIG. 2) configured to perform some or each of the operations (300-550) described above. The processor may, for example, be configured to perform the operations (300-550) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 300, 320, 420, 450, 510, 530, and 540 may comprise, for example, the user interface transceiver 72, the processor 70, and/or a device or circuit for executing instructions or executing an algorithm for processing information as described above. Examples of means for performing operations 310 and 330 may comprise, for example, the processor 70, the sensor 90, and/or a device or circuit for executing instructions or executing an algorithm for processing information as described above. Examples of means for performing operation 350 may comprise, for example, the processor 70, the sensor 90, the user interface transceiver 72, and/or a device or circuit for executing instructions or executing an algorithm for processing information as described above. Examples of means for performing operation 370 may comprise, for example, the communication interface 74, the processor 70, and/or a device or circuit for executing instructions or executing an algorithm for processing information as described above. Examples of means for performing operations 340, 360, 430, and 440 may comprise, for example, the processor 70, the memory device 76, the communication interface 74, and/or a device or circuit for executing instructions or executing an algorithm for processing information as described above. Examples of means for performing operations 400 and 550 may comprise, for example, processor 70, the memory device 76, and/or a device or circuit for executing instructions or executing an algorithm for processing information as described above. Examples of means for performing operation 410 may comprise, for example, the processor 70 and/or a device or circuit for executing instructions or executing an algorithm for processing information as described above. Examples of means for performing operations 500 and 520 may comprise, for example, the processor 70, the user interface transceiver 72, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:

access a predefined distribution list of contacts, wherein the predefined distribution list is smaller than a list of all contacts associated with a user;

in response to receiving an indication of an input via a first device, determine one or more devices proximate to the first device that are detected via at least one of a short range ad-hoc communication or a local area network, and are associated with contacts on the predefined distribution list of contacts;

further in response to receiving the indication of the input, form a subset of the predefined distribution list, wherein the subset is formed by including contacts from the predefined distribution list and associated with the detected one or more devices proximate to the first device and based on prior interaction of a first device with one or more contacts from the list of contacts, wherein the prior interaction is with respect to a content sharing operation to be executed;

provide for display of a selectable user interface element representing the predefined distribution list, wherein the selectable user interface element is expandable to display members of the predefined distribution list, wherein the predefined distribution list comprising members who have a history of content sharing with the first device has a higher priority than one or more other predefined distribution lists comprising members who do not have the history of content sharing with the first device;

receive a user's selection of the predefined distribution list via the user interface element; and provide for communication with the members of the subset by sharing content with the members of the subset based on receipt of the user's selection of the predefined distribution list, wherein non-members of the subset are excluded from the communication.

2. The apparatus of claim 1, wherein the at least one memory and the computer program code are further configured to, with the processor, cause the apparatus to provide for a visual indication of the subset formed.

3. The apparatus of claim 1, wherein the input comprises a wave gesture and is configured to dynamically affect a scan depth coverage area for detecting one or more devices.

4. The apparatus of claim 1, wherein forming the subset is further based on a current time and location of the first device.

5. A method comprising:

accessing a predefined distribution list of contacts, wherein the predefined distribution list is smaller than a list of all contacts associated with a user;

in response to receiving an indication of an input via a first device, determining one or more devices proximate to the first device that are detected via at least one of a short range ad-hoc communication or a local area network, and are associated with contacts on the predefined distribution list of contacts;

further in response to receiving the indication of the input, forming a subset of the predefined distribution list, wherein the subset is formed by including contacts from the predefined distribution list and associated with the one or more detected devices proximate to the first device and based on prior interaction of a first device with one or more contacts from the list of contacts, wherein the prior interaction is with respect to a content sharing operation to be executed;

providing for display of a selectable user interface element representing the predefined distribution list, wherein the selectable user interface element is expandable to display members of the predefined distribution list, wherein the predefined distribution list comprising members who have a history of content sharing with the first device has a higher priority than one or more other predefined distribution lists comprising members who do not have the history of content sharing with the first device;

receiving a user's selection of the predefined distribution list via the user interface element; and providing, via a processor, for communication with the members of the subset by sharing content with the members of the subset based on receipt of the user's selection of the predefined distribution list, wherein non-members of the subset are excluded from the communication.

6. The method of claim 5 further comprising providing for a visual indication of the subset formed.

7. The method of claim 5, wherein the input comprises a wave gesture and is configured to dynamically affect a scan depth coverage area for detecting one or more devices.

8. The method of claim 5, wherein forming the subset is further based on a current time and location of the first device.

9. A computer program product comprising at least one non-transitory computer-readable storage medium having computer-executable program code portions stored therein, the computer-executable program code portions comprising program code instructions for:

accessing a predefined distribution list of contacts, wherein the predefined distribution list is smaller than a list of all contacts associated with a user;

in response to receiving an indication of an input via a first device, determining one or more devices proximate to the first device that are detected via at least one of a short range ad-hoc communication or a local area network, and are associated with contacts on the predefined distribution list of contacts;

further in response to receiving the indication of the input, forming a subset of the predefined distribution list, wherein the subset is formed by including contacts from the predefined distribution list and associated with the detected devices proximate to the first device- and based on prior interaction of a first device with one or more contacts from the list of contacts, wherein the prior interaction is with respect to a content sharing operation to be executed;

providing for display of a selectable user interface element representing the predefined distribution list, wherein the selectable user interface element is expandable to display members of the predefined distribution list, wherein the predefined distribution list comprising members who have a history of content sharing with the first device has a higher priority than one or more other predefined distribution lists comprising members who do not have the history of content sharing with the first device;

receiving a user's selection of the predefined distribution list via the user interface element; and providing for communication with the members of the subset by sharing content with the members of the subset based on receipt of the user's selection of the predefined distribution list, wherein non-members of the subset are excluded from the communication.

10. The computer program product of claim 9, wherein the program code instructions are further configured for providing for a visual indication of the subset formed.

11. The computer program product of claim 9, wherein the input comprises a wave gesture and is configured to dynamically affect a scan depth coverage area for detecting one or more devices.

12. The computer program product of claim 9, wherein forming the subset is further based on a current time and location of the first device.

* * * * *